(12) United States Patent
Soliman et al.

(10) Patent No.: US 11,696,250 B2
(45) Date of Patent: Jul. 4, 2023

(54) UE AND DEVICES FOR DETACH HANDLING

(71) Applicant: Intel Corporation, Santa Clara, CA (US)

(72) Inventors: Ahmed Soliman, Nuremberg (DE); Robert Zaus, Munich (DE)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 16/477,122

(22) PCT Filed: Nov. 8, 2017

(86) PCT No.: PCT/US2017/060562
§ 371 (c)(1),
(2) Date: Jul. 10, 2019

(87) PCT Pub. No.: WO2018/089442
PCT Pub. Date: May 17, 2018

(65) Prior Publication Data
US 2020/0359350 A1 Nov. 12, 2020

Related U.S. Application Data

(60) Provisional application No. 62/419,703, filed on Nov. 9, 2016.

(51) Int. Cl.
*H04W 60/06* (2009.01)
*H04W 76/30* (2018.01)
(Continued)

(52) U.S. Cl.
CPC .......... *H04W 60/06* (2013.01); *H04W 12/06* (2013.01); *H04W 12/106* (2021.01);
(Continued)

(58) Field of Classification Search
None
See application file for complete search history.

(56) References Cited

U.S. PATENT DOCUMENTS 5,329,573 A * 7/1994 Chang ................. H04W 12/126
455/433
5,655,004 A * 8/1997 Holbrook ............ H04W 12/126
455/411
(Continued)

FOREIGN PATENT DOCUMENTS

CN 102740287 A * 10/2012 ............ H04W 12/06
EP 2874367 A1 * 5/2015 ............ H04W 12/06
WO WO-2014107381 A1 * 7/2014 ............ H04W 12/06

OTHER PUBLICATIONS

3GPP TS 24.301 V9.11.0 ("3GPP," 3GPP TS 24.301 V9.11.0, 2013, pp. 1-300). (Year: 2013).*
(Continued)

*Primary Examiner* — Luu T Pham
*Assistant Examiner* — James J Wilcox
(74) *Attorney, Agent, or Firm* — Schwegman Lundberg & Woessner, P.A.

(57) ABSTRACT

Devices, methods, use user equipment (UE), core network devices, evolved node B (eNB), and storage media for UE provisioning are described. In one embodiment, processing circuitry of a mobility management entity (MME) decodes a non-access stratum (NAS) message comprising a detach request associated with a first user equipment (UE) and determines that the detach request is received from the UE without integrity protection. The MME then analyzes one or more additional criteria associated with the detach request in response to confirmation that the detach request message is received from the UE without the integrity protection, and manages an evolved packet system (EPS) mobility management (EMM) registration state for the first UE based on
(Continued)

analysis of the one or more additional criteria. Various different criteria and associated EMM registration state management operations are described. Additional corresponding UE operations are also described.

18 Claims, 9 Drawing Sheets

(51) Int. Cl.
| | |
|---|---|
| H04W 12/06 | (2021.01) |
| H04W 12/106 | (2021.01) |
| H04W 12/75 | (2021.01) |
| H04W 12/10 | (2021.01) |
| H04W 4/90 | (2018.01) |
| H04W 4/70 | (2018.01) |
| H04L 9/40 | (2022.01) |
| H04W 12/122 | (2021.01) |

(52) U.S. Cl.
CPC ......... *H04W 76/30* (2018.02); *H04L 63/1425* (2013.01); *H04W 4/70* (2018.02); *H04W 4/90* (2018.02); *H04W 12/10* (2013.01); *H04W 12/122* (2021.01); *H04W 12/75* (2021.01)

(56) References Cited

U.S. PATENT DOCUMENTS

| | | | | |
|---|---|---|---|---|
| 6,556,820 | B1* | 4/2003 | Le | H04W 8/26 |
| | | | | 455/461 |
| 7,047,007 | B1* | 5/2006 | Asadi | H04W 60/04 |
| | | | | 455/454 |
| 7,085,567 | B1* | 8/2006 | Rajaniemi | H04W 60/06 |
| | | | | 455/410 |
| 8,244,894 | B1* | 8/2012 | Zhao | H04W 60/06 |
| | | | | 709/230 |
| 9,277,462 | B1* | 3/2016 | Ramamurthy | H04W 36/0033 |
| 9,398,521 | B2* | 7/2016 | Zhang | H04W 36/0061 |
| 9,401,735 | B2* | 7/2016 | Petersson | H04B 1/3816 |
| 9,451,583 | B2* | 9/2016 | Okabe | H04W 8/02 |
| 9,491,696 | B2* | 11/2016 | Hirata | H04W 72/52 |
| 9,521,038 | B2* | 12/2016 | Barrett | H04L 41/0806 |
| 9,565,712 | B1* | 2/2017 | Alam | H04W 4/40 |
| 9,622,067 | B1* | 4/2017 | Velusamy | H04W 24/04 |
| 9,622,129 | B2* | 4/2017 | Kim | H04W 76/18 |
| 9,699,698 | B2* | 7/2017 | Cho | H04W 48/16 |
| 9,713,053 | B2* | 7/2017 | Jiang | H04W 8/02 |
| 9,775,075 | B2* | 9/2017 | Aghili | H04W 36/0022 |
| 9,838,991 | B1* | 12/2017 | Campbell | H04W 60/00 |
| 9,843,624 | B1* | 12/2017 | Taaghol | G06F 21/53 |
| 9,872,124 | B2* | 1/2018 | Yang | H04W 76/30 |
| 9,912,547 | B1* | 3/2018 | Douberley | H04L 41/12 |
| 9,924,550 | B2* | 3/2018 | Reynaud | H04W 76/18 |
| 9,929,943 | B1* | 3/2018 | Velusamy | H04L 69/40 |
| 10,009,753 | B2* | 6/2018 | Chang | H04M 15/8083 |
| 10,075,991 | B2* | 9/2018 | Kim | H04W 76/27 |
| 10,123,232 | B2* | 11/2018 | Mishra | H04W 8/22 |
| 10,440,619 | B2* | 10/2019 | Taneja | H04W 36/0061 |
| 2002/0034949 | A1* | 3/2002 | Hoff | H04L 47/32 |
| | | | | 455/445 |
| 2003/0003895 | A1* | 1/2003 | Wallentin | H04L 63/083 |
| | | | | 455/410 |
| 2004/0047308 | A1* | 3/2004 | Kavanagh | H04W 12/106 |
| | | | | 370/465 |
| 2004/0103282 | A1* | 5/2004 | Meier | H04L 9/0891 |
| | | | | 713/171 |
| 2004/0204087 | A1* | 10/2004 | Carlsson | H04W 60/00 |
| | | | | 455/410 |
| 2005/0239441 | A1* | 10/2005 | Eronen | H04W 12/06 |
| | | | | 455/410 |
| 2005/0272422 | A1* | 12/2005 | Asadi | H04W 60/06 |
| | | | | 455/432.2 |
| 2006/0116122 | A1* | 6/2006 | Verma | H04W 12/02 |
| | | | | 455/410 |
| 2006/0120287 | A1* | 6/2006 | Foti | H04L 65/1016 |
| | | | | 370/231 |
| 2006/0172732 | A1* | 8/2006 | Nylander | H04L 63/0272 |
| | | | | 455/433 |
| 2006/0187933 | A1* | 8/2006 | Yi | H04W 60/06 |
| | | | | 370/395.2 |
| 2008/0146222 | A1* | 6/2008 | Vikberg | H04L 63/102 |
| | | | | 455/433 |
| 2009/0204717 | A1* | 8/2009 | Manigandan | H04W 88/02 |
| | | | | 709/230 |
| 2009/0225736 | A1* | 9/2009 | Patarkazishvili | H04W 8/20 |
| | | | | 455/411 |
| 2009/0245177 | A1* | 10/2009 | Zhao | H04W 76/34 |
| | | | | 370/328 |
| 2009/0262736 | A1* | 10/2009 | Zhao | H04W 76/32 |
| | | | | 709/227 |
| 2009/0320100 | A1* | 12/2009 | Kitazoe | H04L 1/1607 |
| | | | | 709/227 |
| 2010/0054472 | A1* | 3/2010 | Barany | H04L 63/123 |
| | | | | 713/168 |
| 2010/0115275 | A1 | 5/2010 | Suh et al. | |
| 2010/0115588 | A1* | 5/2010 | Johannesson | H04W 12/06 |
| | | | | 455/410 |
| 2010/0135255 | A1* | 6/2010 | Zhang | H04W 76/32 |
| | | | | 370/331 |
| 2010/0293372 | A1* | 11/2010 | Fischer | H04W 12/06 |
| | | | | 380/278 |
| 2011/0085517 | A1* | 4/2011 | Yu | H04W 60/06 |
| | | | | 370/331 |
| 2011/0110308 | A1* | 5/2011 | Liang | H04W 60/06 |
| | | | | 370/328 |
| 2011/0128915 | A1* | 6/2011 | Wang | H04W 76/32 |
| | | | | 370/328 |
| 2011/0158090 | A1* | 6/2011 | Riley | H04L 12/1403 |
| | | | | 370/230 |
| 2011/0217951 | A1* | 9/2011 | Tiwari | H04W 60/06 |
| | | | | 455/411 |
| 2011/0294458 | A1* | 12/2011 | Tiwari | H04W 76/34 |
| | | | | 455/404.1 |
| 2012/0009952 | A1* | 1/2012 | Zhang | H04W 68/00 |
| | | | | 455/458 |
| 2012/0028611 | A1* | 2/2012 | Wu | H04W 60/06 |
| | | | | 455/418 |
| 2012/0034898 | A1* | 2/2012 | Tiwari | H04W 4/90 |
| | | | | 455/404.1 |
| 2012/0044868 | A1* | 2/2012 | Faccin | H04W 60/06 |
| | | | | 370/328 |
| 2012/0076121 | A1* | 3/2012 | Choi | H04W 60/005 |
| | | | | 370/338 |
| 2012/0083238 | A1* | 4/2012 | Tiwari | H04W 60/06 |
| | | | | 455/404.1 |
| 2012/0155404 | A1* | 6/2012 | Shin | H04W 60/04 |
| | | | | 370/329 |
| 2012/0189016 | A1* | 7/2012 | Bakker | H04W 76/11 |
| | | | | 370/401 |
| 2012/0218922 | A1* | 8/2012 | Klingenbrunn | H04W 76/10 |
| | | | | 370/280 |
| 2012/0250611 | A1* | 10/2012 | Yang | H04W 76/30 |
| | | | | 370/328 |
| 2012/0252518 | A1* | 10/2012 | Karampatsis | H04W 4/70 |
| | | | | 455/515 |
| 2012/0311335 | A1* | 12/2012 | Fransen | H04L 9/3273 |
| | | | | 713/170 |
| 2013/0012204 | A1* | 1/2013 | Kim | H04W 60/06 |
| | | | | 455/435.1 |
| 2013/0016607 | A1* | 1/2013 | Tiwari | H04W 76/50 |
| | | | | 370/230 |
| 2013/0042304 | A1* | 2/2013 | Rajavelsamy | H04W 36/0022 |
| | | | | 726/3 |
| 2013/0094471 | A1* | 4/2013 | Zhao | H04W 36/0011 |
| | | | | 370/331 |
| 2013/0122905 | A1* | 5/2013 | Casati | H04W 60/06 |
| | | | | 455/435.1 |

(56) References Cited

U.S. PATENT DOCUMENTS

| | | | |
|---|---|---|---|
| 2013/0143540 A1* | 6/2013 | Kalra | H04B 1/3833 455/416 |
| 2013/0155948 A1* | 6/2013 | Pinheiro | H04W 4/08 370/328 |
| 2013/0163434 A1* | 6/2013 | Hamel | H04W 60/06 370/237 |
| 2013/0272268 A1* | 10/2013 | Xu | H04W 76/36 370/331 |
| 2013/0305386 A1* | 11/2013 | Zhang | H04L 63/205 726/27 |
| 2013/0308527 A1* | 11/2013 | Chin | H04W 36/0022 370/328 |
| 2013/0329653 A1* | 12/2013 | Russell, Jr. | H04W 12/06 370/329 |
| 2013/0343304 A1* | 12/2013 | Kaippallimalil | H04W 12/069 370/329 |
| 2014/0003329 A1* | 1/2014 | Chen | H04W 72/0406 370/315 |
| 2014/0003348 A1* | 1/2014 | Velev | H04W 60/06 370/328 |
| 2014/0016539 A1 | 1/2014 | Rohit | |
| 2014/0016614 A1* | 1/2014 | Velev | H04W 4/14 370/331 |
| 2014/0044030 A1* | 2/2014 | Ramachandran | H04W 52/0261 370/311 |
| 2014/0051466 A1* | 2/2014 | Yu | H04W 4/14 455/466 |
| 2014/0105011 A1* | 4/2014 | Chandramouli | H04W 72/121 370/230 |
| 2014/0106746 A1* | 4/2014 | Liu | H04W 60/00 455/435.1 |
| 2014/0128065 A1* | 5/2014 | Motohashi | H04W 60/00 455/435.1 |
| 2014/0185603 A1* | 7/2014 | Kaippallimalil | H04W 36/0027 370/338 |
| 2014/0235240 A1* | 8/2014 | Chen | H04W 60/06 455/435.1 |
| 2014/0241247 A1* | 8/2014 | Kempf | H04W 76/12 370/328 |
| 2014/0242952 A1* | 8/2014 | Zhang | H04W 12/106 455/411 |
| 2014/0321365 A1* | 10/2014 | Shoji | H04W 60/06 370/328 |
| 2014/0342735 A1* | 11/2014 | Liao | H04W 60/06 455/435.1 |
| 2014/0355417 A1 | 12/2014 | Kim et al. | |
| 2014/0355443 A1* | 12/2014 | Smith | H04W 28/0289 370/235 |
| 2015/0023247 A1* | 1/2015 | Hsu | H04W 12/06 370/328 |
| 2015/0024746 A1* | 1/2015 | Adachi | H04W 40/36 455/437 |
| 2015/0029978 A1* | 1/2015 | Tranberg | H04W 76/18 370/329 |
| 2015/0045027 A1* | 2/2015 | Ianev | H04W 4/50 455/435.1 |
| 2015/0071139 A1* | 3/2015 | Nix | H04W 52/0277 370/311 |
| 2015/0087305 A1* | 3/2015 | Gong | H04L 43/16 455/435.1 |
| 2015/0124588 A1* | 5/2015 | Hallenstal | H04L 65/1046 370/221 |
| 2015/0281966 A1* | 10/2015 | Griot | H04W 12/06 726/5 |
| 2015/0282042 A1* | 10/2015 | Griot | H04W 24/08 370/329 |
| 2015/0305085 A1* | 10/2015 | Huang | H04W 76/30 370/328 |
| 2015/0341889 A1* | 11/2015 | Starsinic | H04W 4/70 370/329 |
| 2015/0350880 A1* | 12/2015 | Li | H04W 8/183 370/331 |
| 2016/0043867 A1* | 2/2016 | Bonsignore | H04L 63/0442 713/168 |
| 2016/0066219 A1* | 3/2016 | Poikonen | H04W 36/0022 455/436 |
| 2016/0105864 A1* | 4/2016 | Guo | H04W 8/04 455/435.1 |
| 2016/0142975 A1* | 5/2016 | Rune | H04W 52/0209 455/574 |
| 2016/0149878 A1* | 5/2016 | Pogorelik | G06F 21/6263 380/283 |
| 2016/0212638 A1* | 7/2016 | Jain | H04L 5/0091 |
| 2016/0212682 A1* | 7/2016 | Chung | H04W 12/06 |
| 2016/0227385 A1* | 8/2016 | Ahmad | H04L 65/1073 |
| 2016/0227403 A1* | 8/2016 | Narasimha | H04W 12/06 |
| 2016/0227410 A1* | 8/2016 | Narasimha | H04W 12/04 |
| 2016/0227597 A1* | 8/2016 | Cho | H04W 76/30 |
| 2016/0234744 A1* | 8/2016 | Wu | H04W 36/22 |
| 2016/0237493 A1* | 8/2016 | Brandon | G16B 25/10 |
| 2016/0242032 A1* | 8/2016 | De Kievit | H04L 9/0861 |
| 2016/0249248 A1* | 8/2016 | Rönneke | H04W 28/0284 |
| 2016/0249278 A1* | 8/2016 | Qi | H04W 60/06 |
| 2016/0262203 A1* | 9/2016 | Lindoff | H04W 68/02 |
| 2016/0269925 A1* | 9/2016 | Chou | H04W 28/0226 |
| 2016/0283653 A1* | 9/2016 | Staudt | G16B 25/00 |
| 2016/0286385 A1* | 9/2016 | Ryu | H04W 76/28 |
| 2016/0295408 A1* | 10/2016 | Chen | H04W 12/06 |
| 2016/0295545 A1* | 10/2016 | Tiwari | H04W 60/06 |
| 2016/0309317 A1* | 10/2016 | Yang | H04W 8/12 |
| 2016/0330784 A1* | 11/2016 | Liu | H04W 12/42 |
| 2016/0337184 A1* | 11/2016 | Linden | H04W 4/06 |
| 2016/0344533 A1* | 11/2016 | Wei | H04W 24/04 |
| 2016/0353325 A1* | 12/2016 | Poikonen | H04L 41/0816 |
| 2016/0353337 A1* | 12/2016 | Zhu | H04W 36/00837 |
| 2017/0013512 A1* | 1/2017 | Bi | H04W 8/26 |
| 2017/0013553 A1* | 1/2017 | Huang | H04W 52/0209 |
| 2017/0013554 A1* | 1/2017 | Jain | H04B 7/26 |
| 2017/0013651 A1* | 1/2017 | Moisanen | H04W 72/23 |
| 2017/0026334 A1* | 1/2017 | Youn | H04L 61/5007 |
| 2017/0026896 A1* | 1/2017 | Enomoto | H04W 92/18 |
| 2017/0041980 A1* | 2/2017 | Mouafik | H04M 15/66 |
| 2017/0048684 A1* | 2/2017 | Rönneke | H04L 69/326 |
| 2017/0048758 A1* | 2/2017 | Shu | H04W 36/0022 |
| 2017/0064544 A1* | 3/2017 | Youn | H04L 63/0428 |
| 2017/0078927 A1* | 3/2017 | Hahn | H04W 36/08 |
| 2017/0086065 A1* | 3/2017 | Einarsson | H04W 36/08 |
| 2017/0111879 A1* | 4/2017 | Li | H04W 76/30 |
| 2017/0134973 A1* | 5/2017 | Byun | H04W 92/20 |
| 2017/0135010 A1* | 5/2017 | Iwai | H04W 88/14 |
| 2017/0150351 A1* | 5/2017 | Narasimha | H04W 12/06 |
| 2017/0150352 A1* | 5/2017 | Narasimha | H04W 60/04 |
| 2017/0155516 A1* | 6/2017 | Bergius | H04W 12/04 |
| 2017/0156128 A1* | 6/2017 | Mui | H04L 47/625 |
| 2017/0171832 A1* | 6/2017 | Joshi | H04W 76/19 |
| 2017/0180995 A1* | 6/2017 | Deshpande | H04W 72/042 |
| 2017/0181214 A1* | 6/2017 | Kim | H04W 8/04 |
| 2017/0188325 A1* | 6/2017 | Tsai | H04W 12/033 |
| 2017/0201533 A1* | 7/2017 | Targali | H04L 63/1441 |
| 2017/0218455 A1* | 8/2017 | Steelman | C12Q 1/6886 |
| 2017/0251419 A1* | 8/2017 | Khawer | G06F 13/4282 |
| 2017/0251514 A1* | 8/2017 | Soderlund | H04L 61/5007 |
| 2017/0257742 A1* | 9/2017 | Mihály | H04W 4/023 |
| 2017/0265239 A1* | 9/2017 | Zhang | H04W 76/15 |
| 2017/0295490 A1* | 10/2017 | Jolivet | H04L 63/0876 |
| 2017/0303195 A1* | 10/2017 | Kim | H04W 76/27 |
| 2017/0310592 A1* | 10/2017 | Synnergren | H04L 45/38 |
| 2017/0318445 A1* | 11/2017 | Kodaypak | H04W 4/90 |
| 2017/0318450 A1* | 11/2017 | Salkintzis | H04W 8/02 |
| 2017/0318463 A1* | 11/2017 | Lee | H04W 12/0433 |
| 2017/0318613 A1* | 11/2017 | Kuge | H04W 24/04 |
| 2017/0325094 A1* | 11/2017 | Lee | H04W 12/06 |
| 2017/0332312 A1* | 11/2017 | Jung | H04W 60/00 |
| 2017/0332438 A1* | 11/2017 | Olsson | H04W 28/12 |
| 2017/0339644 A1* | 11/2017 | Lee | H04W 76/38 |
| 2017/0353856 A1* | 12/2017 | Zhang | H04W 12/068 |
| 2017/0367031 A1* | 12/2017 | Kuge | H04W 48/02 |
| 2018/0007630 A1* | 1/2018 | Nacer | H04W 52/0235 |
| 2018/0014276 A1* | 1/2018 | Ramle | H04W 76/18 |

(56) References Cited

U.S. PATENT DOCUMENTS

| | | | |
|---|---|---|---|
| 2018/0014337 A1* | 1/2018 | Kuge | H04W 8/26 |
| 2018/0020399 A1* | 1/2018 | Ke | H04W 48/18 |
| 2018/0048689 A1* | 2/2018 | Johnson | H04M 15/73 |
| 2018/0049018 A1* | 2/2018 | Campbell | H04W 12/35 |
| 2018/0077631 A1* | 3/2018 | Byun | H04W 8/26 |
| 2018/0103367 A1* | 4/2018 | Kim | H04W 76/14 |
| 2018/0124601 A1* | 5/2018 | Vutukuri | H04W 48/14 |
| 2018/0160466 A1* | 6/2018 | Östrup | H04W 60/04 |
| 2018/0167915 A1* | 6/2018 | Lee | H04W 12/108 |
| 2018/0175929 A1* | 6/2018 | Wang | H04W 8/02 |
| 2018/0199187 A1* | 7/2018 | Byun | H04W 8/22 |
| 2018/0206108 A1* | 7/2018 | Chou | H04W 28/0842 |
| 2018/0234809 A1* | 8/2018 | Byun | H04W 4/90 |
| 2018/0234942 A1* | 8/2018 | Kim | H04L 61/5014 |
| 2018/0255515 A1* | 9/2018 | Gupta Hyde | H04W 52/0235 |
| 2018/0270891 A1* | 9/2018 | Kim | H04W 36/0022 |
| 2018/0295509 A1* | 10/2018 | Lee | H04W 8/20 |
| 2018/0310359 A1* | 10/2018 | Takahashi | H04W 76/10 |
| 2018/0314602 A1* | 11/2018 | Speks | H04W 8/30 |
| 2018/0340231 A1* | 11/2018 | LaFleur | A61P 35/02 |
| 2018/0368094 A1* | 12/2018 | Deaconu | H04W 60/04 |
| 2019/0090124 A1* | 3/2019 | Yang | H04W 12/06 |
| 2019/0215762 A1* | 7/2019 | Kim | H04W 88/02 |
| 2020/0059990 A1* | 2/2020 | Wigard | H04W 76/36 |

OTHER PUBLICATIONS

Google Translation of CN102740287 (Year: 2012).*

Buvaneswari et al "Self-Optimization of LTE Networks Utilizing Celnet Xplorer," Bell Labs Technical Journal, pp. 99-118 (Year: 2010).*

Wang et al "A Control-Plane Traffic Analysis Tool for LTE Network," 2014 Sixth International Conference on Intelligent Human-Machine Systems and Cybernetics, IEEE Computer Society, pp. 218-221, (Year: 2014).*

"International Application Serial No. PCT/US2017/060562, International Preliminary Report on Patentability dated May 23, 2019", 10 pgs.

"International Application Serial No. PCT/US2017/060562, International Search Report dated Feb. 19, 2018", 4 pgs.

"International Application Serial No. PCT/US2017/060562, Written Opinion dated Feb. 19, 2018", 8 pgs.

Rao, V Srinivasa, "Protocol Signaling Procedures in LTE", (Sep. 2011), 1-11.

* cited by examiner

UE AND DEVICES FOR DETACH HANDLING

PRIORITY CLAIM

This application is a U.S. National Stage Filing under 35 U.S.C. 371 from International Application No. PCT/US2017/060562, filed Nov. 8, 2017 and published in English as WO 2018/089442 on May 17, 2018, which claims the benefit of priority to U.S. Provisional Patent Application Ser. No. 62/419,703, filed Nov. 9, 2016, and titled "UPDATE MOBILE ORIGINATING DETACH HANDLING," each of which is incorporated herein by reference in its entirety.

TECHNICAL FIELD

Embodiments pertain to systems, methods, and component devices for wireless communications, and particularly to detach handling in Third Generation Partnership Project (3GPP) communication systems.

BACKGROUND

Long term evolution (LTE) and LTE-Advanced are standards for wireless communication of high-speed data for user equipment (UE) such as mobile telephones. Provisioning of wireless devices refers to providing a device with the credentials needed to transfer data over a particular network, which allows a device to connect to the network and transfer data over the network. In some operations, these connections may use secure transmissions, while in other operations, the communications are not secured. Under various operations, a device may detach from the network when certain communication operations are complete.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
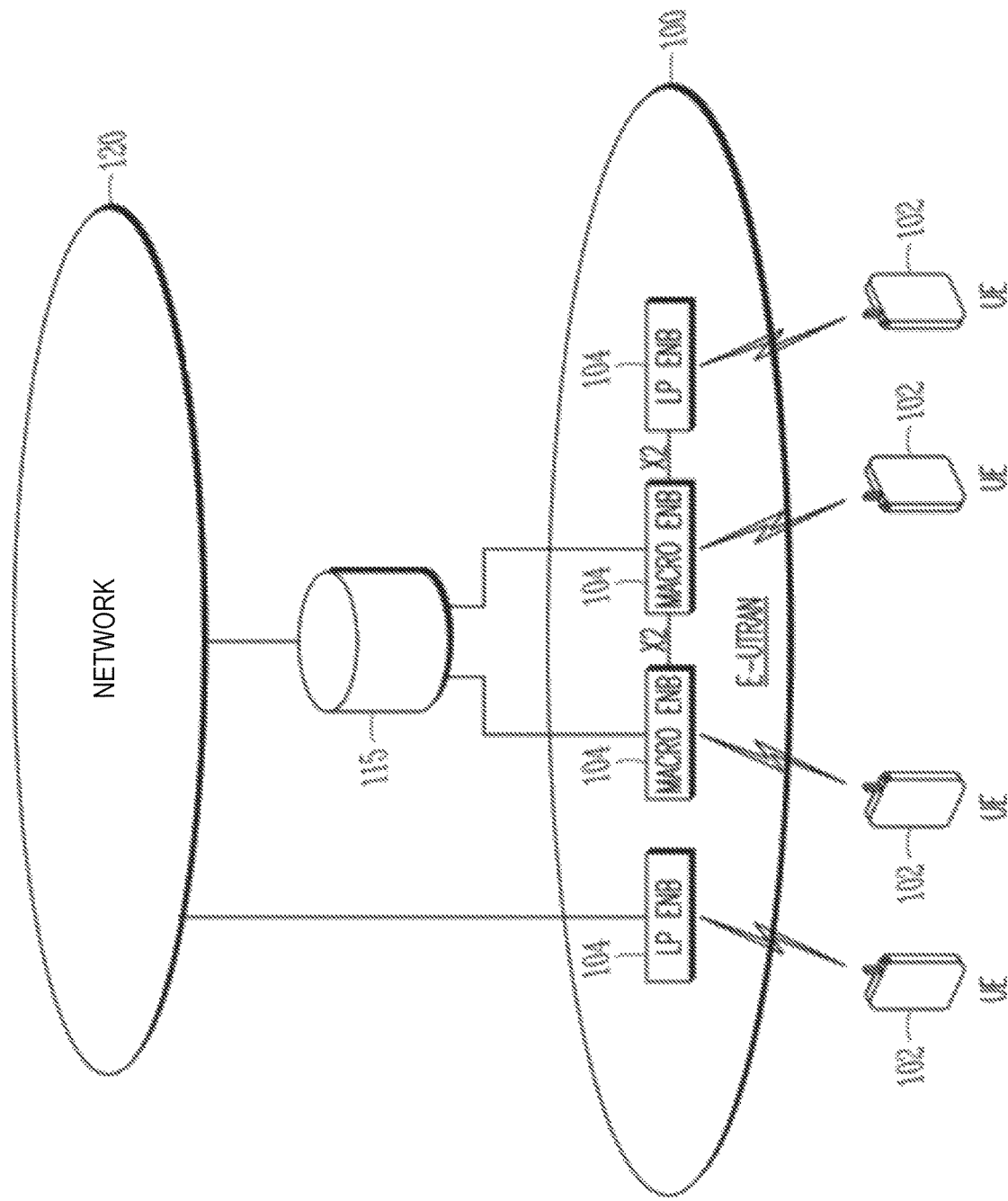
FIG. 1 is a diagram of a wireless network, in accordance with some embodiments.

FIG. 1 shows an example of a portion of an end-to-end network architecture of a network (e.g., an LTE network, a 3GPP standardized network, a compatible NextGen system, etc.) with various components of the network, in accordance with some embodiments. Such a network architecture may be used to implement various communication system implementations, including systems that operate using wireless communication frequencies dedicated exclusively to the system as well as frequencies shared with other systems. Such a network allows UEs to obtain connectivity via the network. Various embodiments described herein may be used by a network to manage detach handling. Certain detach handling operations described herein particularly address system operations when a malicious actor sends a detach communication to the network while impersonating another UE that is registered to the network.

As used herein, "LTE network" refers to both LTE and LTE Advanced (LTE-A) networks, as well as other versions of LTE networks in development, such as 4G and 5G LTE networks, which are examples of NextGen networks. The network may comprise a radio access network (RAN) (e.g., as depicted, the Evolved Universal Terrestrial Radio Access Network (E-UTRAN)) 100 and a core network 120. For convenience and brevity, only a portion of the core network 120, as well as the RAN 100, is shown in the example.

The core network 120 may include various components, such as a mobility management entity (MME), a serving gateway (S-GW), and a packet data network gateway (PDN GW), in addition to other elements discussed below. Various core network systems may include different combinations of elements as described herein. The RAN 100 may include evolved node Bs (eNBs) 104 (which may operate as base stations) for communicating with user equipments (UEs) 102. The eNBs 104 may include macro eNBs and low-power (LP) eNBs. The eNBs 104 may employ the techniques described herein to communicate information between a core network 120 and a UE 102 as described herein.

The eNBs 104 (macro and LP) may terminate the air interface protocol and may be the first point of contact for a UE 102. In some embodiments, an eNB 104 may fulfill various logical functions for the RAN 100 including, but not limited to, radio network controller (RNC) functions such as radio bearer management, uplink and downlink dynamic radio resource management and data packet scheduling, and mobility management. In accordance with some embodiments, the UEs 102 may be configured to communicate orthogonal frequency division multiplexed (OFDM) communication signals with an eNB 104 over a multi-carrier communication channel in accordance with an orthogonal frequency-division multiple access (OFDMA) communication technique. The OFDM signals may comprise a plurality of orthogonal subcarriers.

An interface 115 may be the interface that separates the RAN 100 and the core network 120. It may be split into two parts in some embodiments: the S1-U, which may carry traffic data between the eNBs 104 and an S-GW the core network 120, and the S1-MME, which may be a signaling interface between the eNBs 104 and an MME the core network. An X2 interface may be the interface between pairs of the eNBs 104. The X2 interface may comprise two parts: the X2-C and X2-U. The X2-C may be the control-plane interface between the eNBs 104, while the X2-U may be the user-plane interface between the eNBs 104.

In cellular networks, the LP eNBs 104 in some embodiments are used to extend coverage to indoor areas where outdoor signals do not reach well, or to add network capacity in areas with dense usage. In particular, it may be desirable to enhance the coverage of a wireless communication system using cells of different sizes, such as macrocells, microcells, picocells, and femtocells, to boost system performance. The cells of different sizes may operate on the same frequency band, or may operate on different frequency bands with each cell operating on a different frequency band or only cells of different sizes operating on different frequency bands. As used herein, the term "LP eNB" refers to any suitable relatively LP eNB for implementing a smaller cell (smaller than a macrocell) such as a femtocell, a picocell, or a microcell. Femtocell eNBs are, in some embodiments, provided by a mobile network operator to its residential or enterprise customers. A femtocell, in some embodiments, is the size of a residential gateway or smaller and may generally connect to a broadband line. The femtocell may connect to the mobile operator's mobile network and provide extra coverage in a range of 30 to 50 meters. Similarly, a picocell may be a wireless communication system covering a small area, such as in-building (offices, shopping malls, train stations, etc.), or more recently, in-aircraft. A picocell eNB may generally connect through the X2 link to another eNB such as a macro eNB through its base station controller (BSC) functionality. Thus, an LP eNB 104 may be implemented with a picocell eNB since it may be coupled to a macro eNB 104 via an X2 interface. Picocell eNBs or other such devices may incorporate some or all functionality of a macro eNB 104 or LP eNB 104. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE 102. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system or NextGen systems, however, the frame size (in ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. An RB in some embodiments may be 180 kHz wide in frequency and one slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid in the time domain corresponds to one subframe or two resource blocks. Each resource grid may comprise 12 (subcarriers)×14 (symbols)=168 resource elements.

Each OFDM symbol may contain a cyclic prefix (CP), which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

Figure 2:
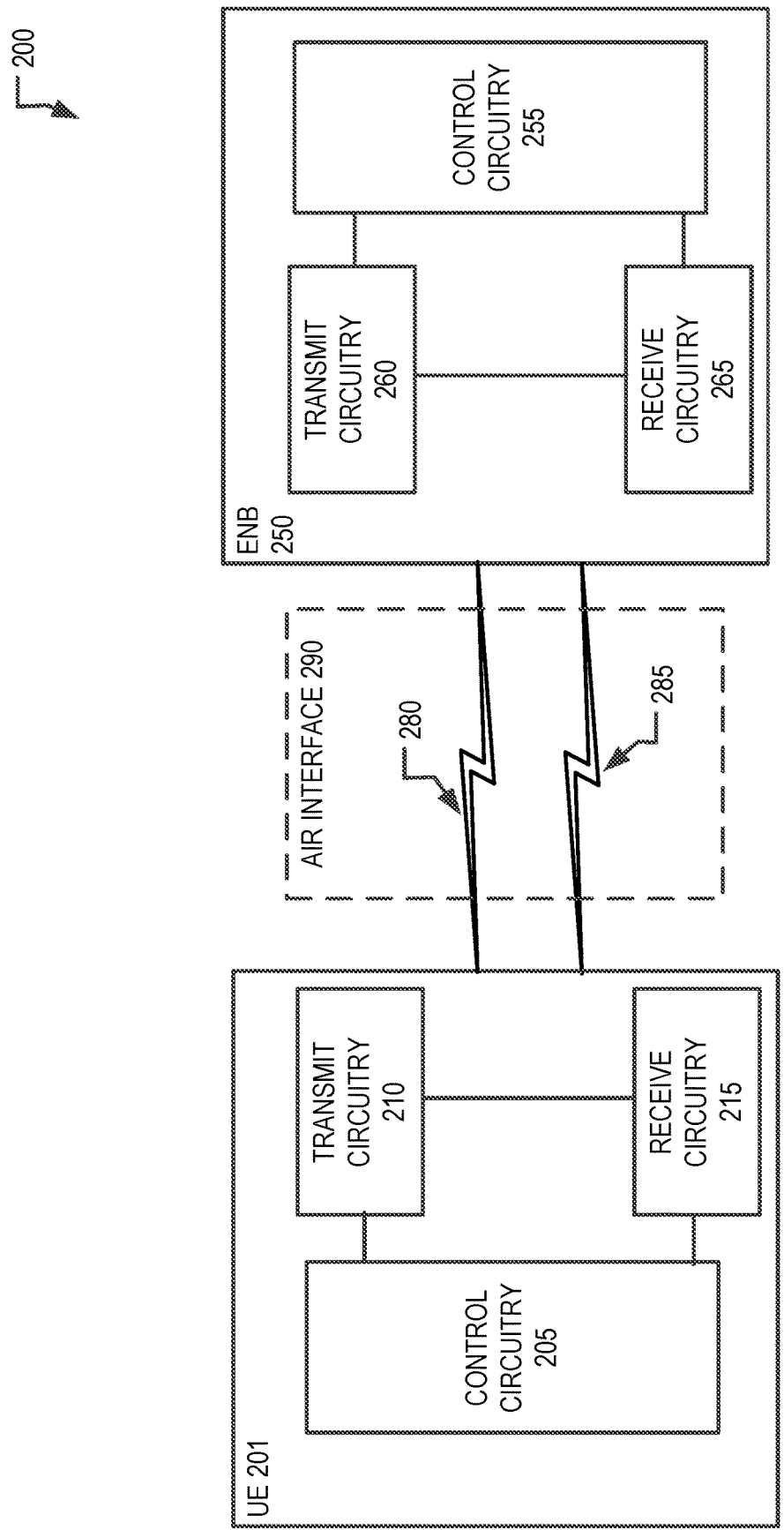
FIG. 2 illustrates components of a wireless communication network, in accordance with some embodiments.

FIG. 2 illustrates a wireless network 200, in accordance with some embodiments. The wireless network 200 includes a UE 201 and an eNB 250 connected via one or more channels 280, 285 across a radio interface 290. The UE 201 and eNB 250 communicate using a system that supports controls for managing the access of the UE 201 to a network via the eNB 250.

In the wireless network 200, the UE 201 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. The eNB 250 provides the UE 201 network connectivity to a broader network (not shown). This UE 201 connectivity is provided via the radio interface 290 in an eNB service area provided by the eNB 250. In some embodiments, such a broader network may be a wide area network (WAN) operated by a cellular network provider, or may be the Internet. Each eNB service area associated with the eNB 250 is supported by antennas integrated with the eNB 250. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 250, for example, includes three sectors, each covering an approximately 120-degree area, with an array of antennas directed to each sector to provide 360-degree coverage around the eNB 250.

The UE 201 includes control circuitry 205 coupled with transmit circuitry 210 and receive circuitry 215. The transmit circuitry 210 and receive circuitry 215 may each be coupled with one or more antennas. The control circuitry 205 may be adapted to perform operations associated with wireless communications using congestion control. The control circuitry 205 may include various combinations of application-specific circuitry and baseband circuitry. The transmit circuitry 210 and receive circuitry 215 may be adapted to transmit and receive data, respectively, and may include radio frequency (RF) circuitry or front end module (FEM) circuitry. In various embodiments, aspects of the transmit circuitry 210, receive circuitry 215, and control circuitry 205 may be integrated in various ways to implement the circuitry described herein. The control circuitry 205 may be adapted or configured to perform various operations such as those described elsewhere in this disclosure related to a UE. The transmit circuitry 210 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 210 may be configured to receive block data from the control circuitry 205 for transmission across the radio interface 290. Similarly, the receive circuitry 215 may receive a plurality of multiplexed downlink physical channels from the radio interface 290 and relay the physical channels to the control circuitry 205. The plurality of downlink physical channels may be multiplexed according to TDM or FDM along with carrier aggregation. The transmit circuitry 210 and the receive circuitry 215 may transmit and receive both control data and content data (e.g., messages, images, video, etc.) structured within data blocks that are carried by the physical channels. For a device configured for low-bandwidth or irregular communications (e.g., utility meters, stationary sensors, etc.), customized circuitry and antennas may be used to enable communications on a narrow bandwidth (e.g., 180 kHz, or other similar narrow bandwidths) to enable the device to consume small amounts of network resources.

FIG. 2 also illustrates the eNB 250, in accordance with various embodiments. The eNB 250 circuitry may include control circuitry 255 coupled with transmit circuitry 260 and receive circuitry 265. The transmit circuitry 260 and receive circuitry 265 may each be coupled with one or more antennas that may be used to enable communications via the radio interface 290.

The control circuitry 255 may be adapted to perform operations for managing channels and congestion control communications used with various UEs, including communication of open mobile alliance (OMA) management objects (OMA-MOs) describing application categories, as detailed further below. The transmit circuitry 260 and receive circuitry 265 may be adapted to transmit and receive data, respectively, to any UE connected to the eNB 250. The transmit circuitry 260 may transmit downlink physical channels comprised of a plurality of downlink subframes. The receive circuitry 265 may receive a plurality of uplink physical channels from various UEs including the UE 201. In embodiments described herein, the receive circuitry 265 may receive a plurality of uplink physical channels simultaneously on multiple unlicensed-frequency channels from a single UE.

Figure 3:
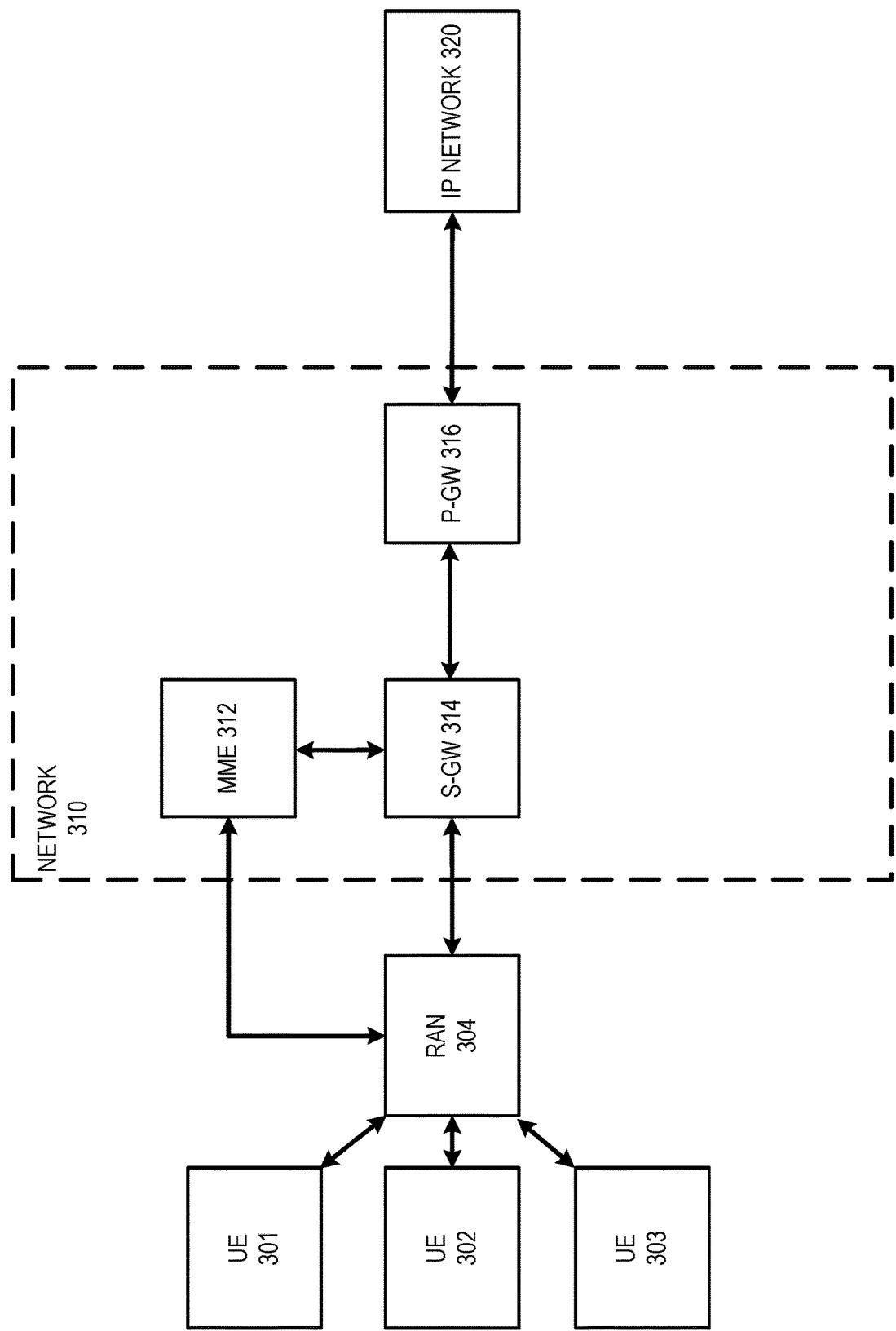
FIG. 3 illustrates aspects of a wireless network, in accordance with various embodiments described herein.

FIG. 3 describes one example network system that may be used for detach handling of UEs, in accordance with the embodiments described herein. The network of FIG. 3B may be considered an LTE 3GPP network. The architecture of FIG. 3 includes UEs 301, 303, 302, RAN 304, core network 310, and internet protocol (IP) network 320. Ran 304 and core network 310 serve to connect UEs 301, 302, 303 with IP network 320, which further provides access to a wide variety of data sources to the UEs. Core network 310 includes MME 312, S-GW 314, and Packet Data Network Gateway (P-GW) 316.

UE 302 is connected to RAN 304. The RAN 304 represents a base station using any suitable radio access technology (RAT). As part of communication operations, a UE will attach to the system and then send a detach request under various circumstances (e.g., UE power off, etc.).

In the legacy detach procedure handling in 3GPP systems, the network processes a detach request message even if it is received without integrity protection or if the Message Authentication Code (MAC) included in the detach request message fails the integrity check. In some systems, this behavior is considered acceptable, because there are some specific scenarios where the UE may send a detach request message when no valid EPS (evolved packet system) security context is available (e.g., a genuine UE may send detach request without integrity protection if the UE is emergency attached and there is no valid EPS security context established between UE and associated mobility management entity (MME), or if a UE is attached to the network but a NAS (non-access stratum) count wrap around occurs before the network can establish a new security key access security management entity (KASME) using an authentication and key agreement (AKA), and therefore the EPS security can no longer be used). Furthermore, there can be cases where the EPS security context used by the UE is not or no longer available on the network side.

However, the legacy detach procedure handling can result in a severe security issue, as it can be used by a malicious UE to detach genuine UEs. For example, a malicious UE (e.g., UE 303) can send an unprotected detach request with the genuine UE's identity (e.g. a UE an identity for UE 301 or 302). This issue can become serious, especially for MTC (machine type communication) and CIoT (cellular internet of things) devices, as in many cases MTC and CIoT devices are located in remote areas with low/no interaction with a human user, so it is hard to detect or prevent this kind of attack.

One aspect of this kind of attack is that the hacker can detach the UE and prevent the UE connectivity at any time, which means that 1) the hacker can perform the attack at any time while the genuine UE is in idle mode, thus making the genuine UE unreachable for paging until the UE attempts to access the network and detects that it is no longer attached; or 2) the hacker (e.g., UE 303) can attempt to perform the attack while the genuine UE (e.g., UE 301 or 302) is in connected mode. This latter attack would be more difficult to perform, as it requires a permanent presence of the hacker in the cell, but the hacker could use this attack to prevent the genuine UE from sending/receiving critical information at a specific time. Especially in combination with scenario 1, the attack could be used to interfere with a (re-)attach procedure initiated by the genuine UE, by sending the detach request before the network is able to activate security protection for the NAS signaling connection. Dependent on the MME 312 implementation, there is also a risk that the MME 312 will accept a detach request received from the malicious UE 303 via a new NAS signaling connection, while the MME 312 still has a first NAS signaling connection to the genuine UE 301 or 302 active.

Embodiments described herein thus involve operations at MME 312 to prevent a hacking device such as UE 303 from causing a genuine UE 301 or 302 to become detached from the network with an unsecured and malicious detach request.

Figure 4:
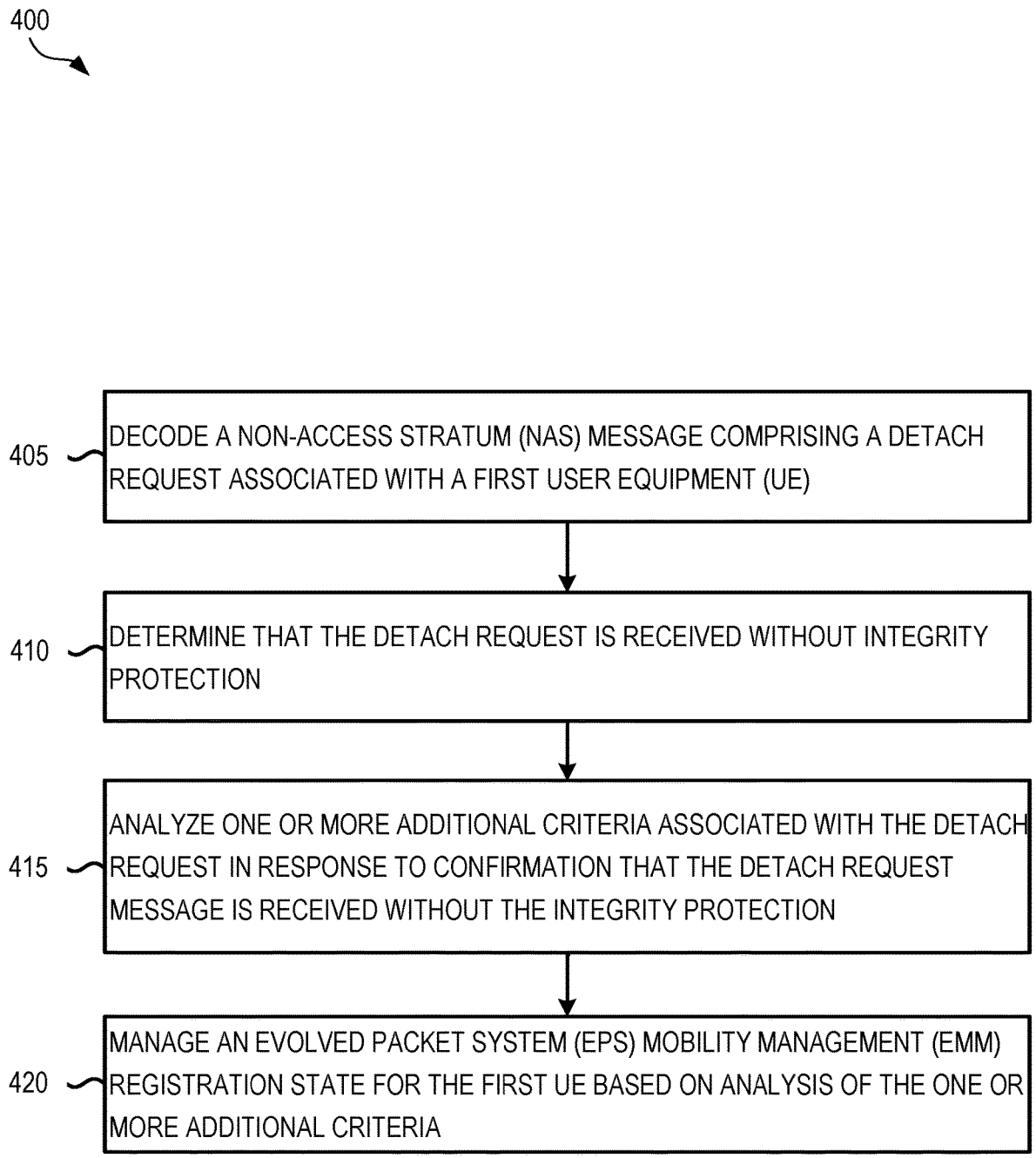
FIG. 4 illustrates one example method for device operation, in accordance with embodiments described herein.

FIG. 4 illustrates one example method for MME operation, in accordance with embodiments described herein. In some embodiments, method 400 of FIG. 4 may be implemented by one or more processors of a MME such as MME 312, or an apparatus of an MME that includes processing circuitry. In some embodiments, processors of different devices within a core network may perform the operations of method 400. In other embodiments, method 400 may be implemented as computer-readable instructions in a storage media that, when executed by one or more processors of a device, cause the device to perform method 400.

Method 400 begins with operation 405, where a NAS message comprising a detach request associated with a first UE is received and decoded. The apparatus then determines, in operation 410, that the detach request is received without integrity protection. As detailed above, in certain circumstances, a genuine UE may send such a communication, but the lack of integrity protection makes such a communication more vulnerable to exploitation from a malicious actor. While the NAS message indicates it is from a first UE, the actual message may be from another UE pretending to be the first UE. Embodiments described herein thus perform additional checking when the NAS message is received without integrity protection (e.g., without a MAC). Thus, in operation 415, the apparatus analyzes one or more additional criteria associated with the detach request in response to confirmation that the detach request message is received without the integrity protection. Various specific additional criteria and additional operations based on different conditions are described in more detail below. Regardless of the particular operations and criteria considered, the method proceeds with operation 420 where an evolved packet system mobility management (EMM) registration state for the first UE is managed based on the analysis of the one or more criteria. This may involve a decision to maintain a current EMM-REGISTERED state, or may involve changing the EMM registration state to EMM-DEREGISTERED.

Some such embodiment may operate where the one or more additional criteria comprise the passing of an authentication procedure. Such operations involve criteria used to determine whether the UE passes the authentication procedure. If the UE passes the procedure, then the detach request is accepted. If the UE does not pass the authentication procedure, then the detach request is rejected. In either case, the EMM registration state is managed appropriately.

Other embodiments may operate where paging procedures are checked. In some embodiments, UEs are configured to respond to a paging operation from the MME with an integrity protected response. When the MME receives the integrity protected response to the paging, the associated integrity can be checked against information for the UE identified in the NAS message received without integrity protection. If the paging response matches the UE associated with the detach request of the NAS message, the criteria fails and the first UE will remain registered.

Similarly, the MME may delay management of the EMM registration state based on a tracking area update schedule. Receipt of a tracking area update after receipt of the detach request operates as criteria to indicate that the detach request is not authentic. If no tracking area update is received, the criteria passes and the EMM state is changed to deregistered. In some embodiments, delay for one update period associated with a periodic tracking area update is sufficient to determine whether the criteria is met. In such embodiments, this is sufficient to provide a basis for managing the EMM status based on the additional tracking area update criteria. In other embodiments, other criteria are used, such as additional periods based on a history of connection problems with the UE.

Different criteria may be used under different circumstances. For example, if the UE is attached to the network for emergency bearer services with no shared EPS security context available, then an authentication communication procedure is not available to the network. In such circumstances, however, periodic tracking area update criteria and paging criteria can both be used. Alternatively, for this specific case the MME may accept the DETACH REQUEST message. By contrast, in a power saving mode where a UE transceiver can be powered off since the UE does not need to listen to system information broadcasts or paging from the network, a UE will not react to paging, and so that criteria will not be available under such circumstances. Similar limitations occur under other UE operating states. For example, for extended discontinuous reception (DRX), the UE is scheduled to listen to paging only in certain intervals, and so the UE may not respond to paging for detach verification criteria purposes.

Thus, some embodiments change network behavior for the mobile originating (MO) detach procedure to enable the network to differentiate between the detach request message received from the genuine UE (e.g., UE 301 or 302) and the detach request message received from the malicious UE (e.g., UE 303).

Some aspects of some embodiments include determining that if the detach request message passes the integrity check, (e.g., if the MME can verify the MAC included in the message), then the MME may accept the detach request.

Other embodiments may determine that if the detach request message does not pass the integrity check, (e.g., either the message is not integrity protected or the MAC included in the message cannot be verified), the MME may accept or ignore the detach request, dependent on whether certain additional conditions are fulfilled.

In some embodiments, the MME can attempt to authenticate the UE. If the UE is successfully attached to the network, a valid EPS security context exists, and the detach request message is not due to "switch off," the MME may attempt to authenticate the subscriber before processing the detach request any further. If authentication is successful, the MME may accept the detach request; if authentication fails, the MME may discard the detach request and keep the genuine UE registered. If the MME cannot authenticate the UE, because it cannot get authentication vectors from the UE's Authentication Center (AuC), then if the UE is already emergency attached and there is no valid EPS security context established between UE and MME, the MME may either accept the detach request message or postpone the handling of the message and detach the UE when the mobile reachable timer expires.

In some embodiments, the MME cannot authenticate the UE because the detach request is due to "switch off" (e.g., as it is allowed to a genuine UE performing detach due to "switch off" to ignore an authentication request received in this state). This may also occur in a situation where the system detects that the UE may have set the key set identifier (KSI) to "no key is available" due to a NAS COUNT wrap around issue (for example if the UL NAS COUNT stored in the MME>max value (NAS COUNT)–k, with k an implementation dependent threshold). This may also occur if, during an attach procedure, the MME receives a detach request due to "switch off" without integrity protection before receiving an attach complete message, and all previous messages, beginning with the attach request message, were sent by the UE without integrity protection. Lack of authentication may also occur during an attach procedure, before receiving an attach complete message, when the MME receives a detach request due to "switch off" including a MAC, but the MME cannot verify the MAC, and all the previous messages sent by the UE, beginning with the attach request message, included a MAC, but the MME could not verify the MAC (e.g., because the MME does not have any EPS security context or it does not have the correct EPS security context for this UE). For such cases, the MME may either accept the detach request message or postpone the handling of the message and attempt to check whether it was sent from the genuine UE by paging the UE after release of the NAS signaling connection.

For other "switch off" cases not described that occur in various embodiments, the MME may either ignore the detach request message or postpone the handling of the message and attempt to check whether it was sent from the genuine UE by paging the UE after release of the NAS signaling connection.

For the cases above where the MME is unable to authenticate the UE due to switch off without any messages received with integrity protection or due to inability to verify the MAC because the MME does not have an EPS security context or does not have the correct EPS security context for a particular UE, the MME may also postpone the handling of a detach request message and continue with the attach procedure (e.g., if the MME already sent an attach accept message, it may wait to check whether a genuine UE is still sending an attach complete message via the available NAS signaling connection.)

Additionally, in some embodiments the MME may use additional criteria when deciding whether to accept or ignore the detach request. For example, the MME may implement a mechanism to detect potential security attacks, such as one or more counters to count the number of events where the MME receives a detach request without integrity protection or a detach request for which the MAC is failing the integrity check. The counters can be defined for a specific event type segmented among any different event type or attack described herein, such as a UE responding to subsequent paging with system architecture evolution temporary mobile subscriber identity (S-TMSI), although the MME received a detach request for the same S-TMSI before. Another segment may be, for example, any detach request due to 'switch off'. In such embodiments, if one or more of these counters exceed a certain threshold, or if the number of events counted within a certain period exceeds a certain threshold for one or more counters, the MME is configured to diagnose a potential security attack and informs the operator via an alarm. Additionally, dependent on the frequency of the counted events, the MME may ignore certain cases of detach requests received which cannot be successfully integrity checked. For example, an MME may ignore any detach request which cannot be successfully integrity checked immediately without triggering a paging or authentication procedure to avoid overloading the genuine UEs with signaling; the MME may ignore any detach request which cannot be successfully integrity checked, unless it belongs to one a particular segment; or the MME may ignore any detach request due to "switch off" which cannot be successfully integrity checked.

In various embodiments, any such combination of circumstances may be identified and combined with count thresholds to manage detach handling, in accordance with the embodiments described herein.

Some embodiments disclosed herein provide benefits over applying the rule "discard any detach requests if they cannot be successfully integrity checked," because the various embodiments may take into account that for certain cases (e.g., IP multimedia subsystem (IMS)) emergency call in "limited service state"), it is not possible for the UE to send a detach request with integrity protection. Additionally, some embodiments described herein provide a process to enable an MME to verify whether the detach request was sent by a malicious UE (e.g., by checking whether the genuine UE is still responding to paging).

As described above, a number of "switch off" circumstances occur in which an MME is not able to authenticate a UE. For such circumstances, the MME may attempt to check whether the detach request message was sent from the genuine UE by paging the UE after release of the NAS signaling connection. For this, the MME may take the possible use of features like power saving mode (PSM) or extended DRX (eDRX) into account, as these features may influence the genuine UE's capability to respond to the paging.

In some embodiments, if PSM and eDRX are not enabled for the UE, the MME may release the connection and send a paging to the UE. In some embodiments, this is done immediately after connection release. In other embodiments, this is done after an implementation dependent time, in order to avoid an overload of the paging channel. If the MME receives a response from the UE, this means that the genuine UE is still attached. The MME may thus infer that the detach request was sent by a malicious UE, and the MME can ignore the received detach request. If the network does not receive a response from the UE, the MME may assume that the detach request was sent by the genuine UE, handle the received detach request, and mark the UE as DEREGISTERED. In principle, it is also possible that the detach request was sent by a malicious UE and for some reason the genuine UE currently cannot respond to paging (e.g., because it is out-of-coverage). The MME may take this into account in some embodiments by, for example, considering the paging success rate for this specific UE, the success rate averaged over all UEs located in the specific tracking area, or both, and by repeating the paging accordingly. Furthermore, the MME can take other criteria into account such as the likelihood that currently a security attack based on 'malicious' detach requests is ongoing derived from corresponding event counters.

In some such embodiments, if eDRX is enabled, the MME may release the connection and send a paging to the UE at one of the next paging occasions. If PSM is enabled, the MME may release the connection and send a paging to the UE. If the genuine UE is still within the active time, assuming that the detach request was sent by a malicious UE and the genuine UE remained in idle mode, the UE may respond. In some embodiments, a malicious UE can send the detach request when the active time for the genuine UE is over, and for this case, the MME may release the connection and wait until the mobile reachable timer expires and then detach the UE. Similarly, in some embodiments, if PSM or eDRX is enabled, the MME may release the connection, wait until the mobile reachable timer expires, and then the MME may detach the UE.

In such systems, the mobile reachable timer expires if the UE misses its periodic tracking area update (TAU). In some systems, the MME will then stop sending paging for this UE, even if the UE did not send a detach request and the UE is still considered attached. Expiry of the mobile reachable timer can mean that the detach request was sent by the genuine UE. If it was sent by a malicious UE and the genuine UE missed the periodic TAU because it is out-of-coverage, the genuine UE will initiate the periodic TAU when it returns to coverage. The MME will then reject the TAU with an EPS mobility management (EMM) cause, which causes the genuine UE to reattach to the network. This results in the detach being repaired.

For circumstances where a detach request is received during an ongoing attach procedure, the MME may postpone the handling of the detach request and continue with the attach procedure. For example, when the MME has already sent an attach accept message, it may wait whether a genuine UE sends an attach complete message or whether the supervision timer (e.g., T3450=6 sec) for receipt of the attach complete message expires.

Upon expiry of the supervision timer, the MME may retransmit the attach accept message and start the supervision time again. The MME's decision on whether to retransmit the attach accept message may depend on the radio conditions, (e.g., if the UE is operating under "enhanced coverage conditions" for which there is a higher risk that an attach accept or attach complete message will be lost). The same handling can also be applied for the case of an attach procedure with attach type "emergency, for which the MME cannot get authentication vectors from the UE's AuC, and where before receiving an attach complete message, the MME receives a detach request message for which it cannot verify the integrity protection.

Additionally, in some embodiments, the MME may consider further cases where the MME may not be able to successfully verify the detach request message, because the current EPS security context stored by the UE is different from the one stored by the MME. In some such embodiments, it is possible that in the past an MME failure occurred while the MME was performing a NAS security mode control procedure with the UE to take a new security context into use. For that case, the UE may have already acknowledged the security mode command, but on the MME side, the MME performed a reset or partial reset and thus the acknowledgement was lost so that the new security context was not activated. If the UE sends a detach request later, it will integrity protect it with the new current security context, which on the MME side is considered not yet activated. The MME can determine that such a situation may be present if the detach request message is the first message the MME receives from this UE. This may occur since the MME performed a reset or partial reset affecting the UEs context, and the NAS Key Set Identifier eKSI (EPS KSI) included by the UE in the detach request message, which identifies the EPS security context used by the UE, is different from the eKSI stored in the MME for the current EPS security context.

Further still, some embodiments may include the aspect of changing the network behavior in the MO detach procedure to enable the network to differentiate between the detach request message received from genuine UE and detach request message received from malicious UE. While some of the behavior above maybe implementation dependent, the following provides example changes for the 3GPP specification TS 24.301 Non-Access-Stratum (NAS) protocol for Evolved Packet System (EPS) in some embodiments:

4.4.4.3 Integrity checking of NAS signaling messages in the MME Except the messages listed below, no NAS signaling messages shall be processed by the receiving EMM entity in the MME or forwarded to the ESM entity, unless the secure exchange of NAS messages has been established for the NAS signaling connection:

EMM messages:
ATTACH REQUEST;
IDENTITY RESPONSE (if requested identification parameter is IMSI (international mobile subscriber identity);
AUTHENTICATION RESPONSE;
AUTHENTICATION FAILURE;
SECURITY MODE REJECT;
detach request;
DETACH ACCEPT;
TRACKING AREA UPDATE REQUEST NOTE 1: The TRACKING AREA UPDATE REQUEST message is sent by the UE without integrity protection, if the tracking area updating procedure is initiated due to an intersystem change in idle mode and no current EPS security context is available in the UE. The other messages are accepted by the MME without integrity protection, as in certain situations they are sent by the UE before security can be activated.

NOTE 2: The detach request message can be sent by the UE without integrity protection, e.g. if the UE is attached for emergency bearer services and there is no shared EPS security context available, or if due to user interaction an attach procedure needs to be cancelled before the secure exchange of NAS messages has been established. For these cases, the network can attempt to use additional criteria (e.g. whether the UE is subsequently still responding to paging or performing periodic tracking area updates) before deciding to mark the UE as EMM-DEREGISTERED.

All ESM messages are integrity protected except a PDN CONNECTIVITY REQUEST message if it is sent piggybacked in ATTACH REQUEST message and NAS security is not activated.

Once a current EPS security context exists, until the secure exchange of NAS messages has been established for the NAS signaling connection, the receiving EMM entity in the MME shall process the following NAS signaling messages, even if the MAC included in the message fails the integrity check or cannot be verified, as the EPS security context is not available in the network:

ATTACH REQUEST;
IDENTITY RESPONSE (if requested identification parameter is IMSI);
AUTHENTICATION RESPONSE;
AUTHENTICATION FAILURE;
SECURITY MODE REJECT;
detach request (if sent before security has been activated);
DETACH ACCEPT;
TRACKING AREA UPDATE REQUEST;
SERVICE REQUEST;
EXTENDED SERVICE REQUEST NOTE 3: These messages are processed by the MME even when the MAC that fails the integrity check or cannot be verified, as in certain situations they can be sent by the UE protected with an EPS security context that is no longer available in the network.

If an ATTACH REQUEST message fails the integrity check and it is not an attach request for emergency bearer services, the MME shall authenticate the subscriber before processing the attach request any further. For the case when the attach procedure is for emergency bearer services see subclause 5.5.1.2.3 and subclause 5.4.2.5.

If a detach request message fails the integrity check, it is not a detach request due to switch off, and the MME can initiate an authentication procedure, the MME shall authenticate the subscriber before processing the detach request any further.

If a detach request message fails the integrity check and it is a detach request due to switch off, or the MME cannot initiate an authentication procedure, the MME may ignore the detach request or mark the UE as EMM-DEREGISTERED.

NOTE 4: The network can attempt to use additional criteria (e.g. whether the UE is subsequently still responding to paging or performing periodic tracking area updates) before taking this decision.

If a TRACKING AREA UPDATE REQUEST message fails the integrity check and the UE provided a nonce, GPRS (general packet radio service) ciphering key sequence number, PTMSI (packet temporary mobile subscriber identity) and RAI (routing area identification) in the TRACKING AREA UP DATE REQUEST message, the MME shall initiate a security mode control procedure to take a new mapped EPS security context into use; otherwise if the UE has only a PDN connection for non-emergency bearer services established, the MME shall initiate an authentication procedure. For the case when the UE has a PDN connection for emergency bearer services see subclause 5.5.3.2.3 and subclause 5.4.2.5.

Figure 5:
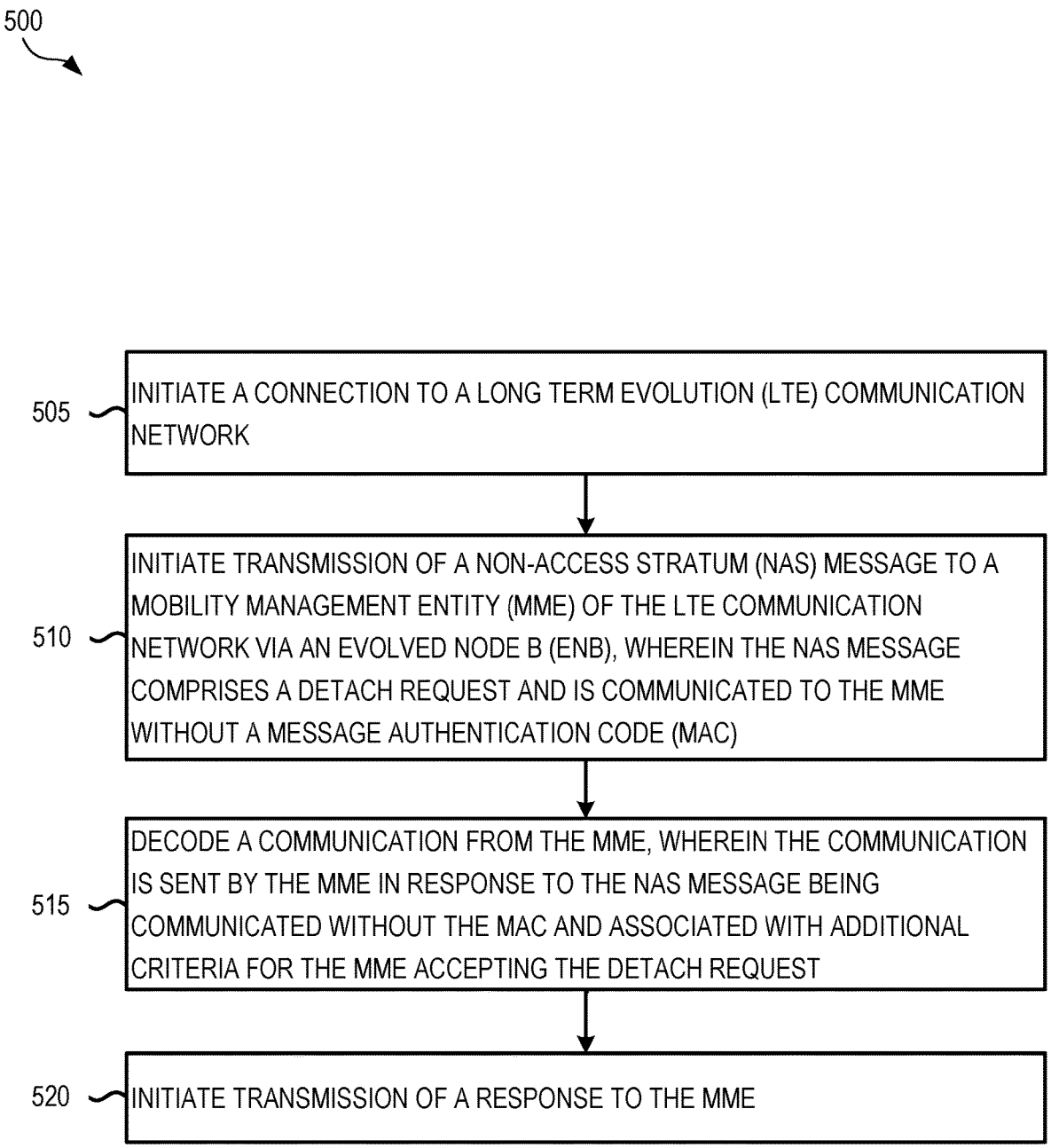
FIG. 5 illustrates an example method performed by a UE, in accordance with embodiments described herein.

FIG. 5 illustrates an example method 500 that may be performed by a UE or an apparatus of a UE with processing circuitry, in accordance with embodiments described herein. Method 500 may, for example, be a complementary operation performed by a UE device or an apparatus of UE while a corresponding MME performs method 400. As will be apparent, method 500 will occur when the UE performing method 500 is an authentic UE. In some other systems, certain operations will be performed by a malicious UE impersonating the authentic UE. In method 500, a malicious UE may attempt to contact the MME independent of the operations of method 500, with the MME responding to the device of method 500 based on an independent malicious UE attempting to spoof, mimic, impersonate, or otherwise pretend to be the UE performing method 500. In other embodiments, method 500 may be implemented as computer-readable instructions in a storage media that, when executed by one or more processors of one or more core network devices, cause the one or more devices to perform method 500.

Method 500 begins with operation 505 where a connection to a LTE communication network (e.g., for emergency bearer services) is initiated. In operation 510, the UE initiates transmission of a NAS message to a MME of the LTE communication network via an eNB, wherein the NAS message comprises a detach request communicated to the MME without a MAC. In operation 515, the UE then decodes a communication from the MME, wherein the communication is sent by the MME in response to the NAS message being communicated without the MAC, and wherein the communication is associated with additional criteria for the MME accepting the detach request. The UE then initiates a response to the communication in operation 520. The response provides criteria information that allows the MME to confirm that the detach request is authentic. For example, in some embodiments, the communication may be a paging, with the paging response providing a MAC or other identifying information for the first UE. In some other embodiments, the communication may be an authentication communication comprising an authentication request, with the response providing an authentication response to the MME.

Methods 400 and 500 describe particular embodiments, but it will be apparent that additional methods, in accordance with the embodiments described herein, are possible with repeated or intervening operations to achieve UE provisioning. For example, additional embodiments of operations at a MME are described above, and it will be apparent that other corresponding UE operations other than those of method 500 will occur in conjunction with the described MME operations. Further still, any embodiments described above may be performed with repeated operations or intervening operations in various different embodiments. An additional set of non-exhaustive embodiments is further presented below.

EXAMPLE EMBODIMENTS

In addition to the above example embodiments, any combination of operations or elements described above may be integrated into various embodiments described herein.

Example 1 is an apparatus, comprising: means for identifying a detach request message that is not integrity protected or includes a non-verifiable message authentication code (MAC); and means for checking a criterion to identify whether to accept the detach request message.

Example 2 may include the subject matter of example 1 and/or some other example herein, wherein means for checking the criterion to identify whether to accept the detach request message comprises means for initiating an authentication procedure with a UE (user equipment) specified by the detach request message.

Example 3 may include the subject matter of any of examples 1-2 and/or some other example herein, the authentication procedure to be initiated based on whether the detach request message indicates switch off.

Example 4 may include the subject matter of any of examples 1-3 and/or some other example herein, wherein the criterion includes at least one of: receipt of a response from the UE to a page after release of a connection with the UE; receipt of a periodic tracking area update request within a predetermined time after release of the connection with the UE, and the UE uses power saving mode (PSM) and/or extended discontinuous reception (eDRX); receipt of the detach request message during an attach procedure and receipt of an attach complete message via a same connection corresponding to the attach request message; or a count to be incremented based on the detach request message, if the message is not integrity protected or includes a non-verifiable message authentication code (MAC), is less than a threshold.

Example 5 may include the subject matter of any of examples 1-4 and/or some other example herein, wherein the apparatus is a network device or a portion thereof.

Example 6 is an apparatus, comprising: means for transmitting a detach request message that is not integrity protected or includes a non-verifiable message authentication code (MAC); and means for responding to at least one of an authentication request or a page to verify the detach request message.

Example 7 may include the subject matter of example 6 and/or some other example herein, means for receiving a communication of the page after release of a non-access stratum (NAS) signaling connection.

Example 8 may include the subject matter of any of examples 6-7 and/or some other example herein, wherein the authentication request is of a remotely-initiated authentication procedure.

Example 9 may include the subject matter of any of examples 6-8 and/or some other example herein, further comprising: means for transmitting, or causing to be transmitted, an attach request; means for transmitting, or causing to be transmitted, an attach confirm in response to receipt of an attach accept for the attach request.

Example 10 may include the subject matter of any of examples 6-9 and/or some other example herein, wherein the apparatus is a UE (user equipment) or a portion thereof.

Example 11 may include a mobile network, receiving a Detach Request message from a User Equipment (UE), wherein the Detach Request message does not include a message authentication code (MAC) protecting the integrity of the message, or the Detach Request message includes a MAC, but the network is not able to verify the MAC; and the network decides to ignore the Detach Request message based on at least one additional criterion.

Example 12 may include the mobile network of example 11 and/or some other example herein, wherein the additional criterion is that the UE fails an authentication procedure initiated by the network upon receipt of the Detach Request message.

Example 13 may include the mobile network of example 12 and/or some other example herein, wherein the network initiates the authentication procedure if the Detach Request message indicates that the detach request is not due to "switch off".

Example 14 may include the mobile network of example 11 and/or some other example herein, wherein the additional criterion is that the UE responds to a paging performed by the network after the network released the connection between the UE and the network.

Example 15 may include the mobile network of example 11 and/or some other example herein, wherein the additional criterion is that the UE uses power saving mode (PSM) or extended discontinuous reception (eDRX) and the network receives a periodic tracking area updating request within a certain period after the network released the connection between the UE and the network.

Example 16 may include the mobile network of example 11 and/or some other example herein, wherein the additional criterion is that the network receives the Detach Request message during an attach procedure, and after receiving the Detach Request message, the network also receives an Attach Complete message via the same connection.

Example 17 may include the mobile network of example 11 and/or some other example herein, wherein the network maintains at least one counter for counting events where the network receives a Detach Request message that does not include a MAC or where the Detach Request message includes a MAC, but the network is not able to verify the MAC; and the network decides to ignore the Detach Request message at least partially based on a criterion that the number of counted events exceeds a certain limit or on a criterion that the number of events counted within a certain time interval exceeds a certain limit.

Example 18 is an apparatus to: transmit a detach request message that is not integrity protected or includes a non-verifiable message authentication code (MAC); and identify at least one of an authentication request or a page to verify the detach request message based on a local operating state.

Example 19 includes the subject matter of example 18 and/or some other example herein, the apparatus to identify a communication of the page after release of a non-access stratum (NAS) signal connection.

Example 20 may include the subject matter of any of examples 18-19 and/or some other example herein, wherein the apparatus is a UE (user equipment) or a portion thereof.

Example 21 is an apparatus to: identify a detach request message that is not integrity protected (a first criterion) or includes a non-verifiable message authentication code (MAC) (a second criterion); and ascertain whether to drop the detach request message based on third criterion that is different than the first criterion and the second criterion.

Example 22 may include the subject matter of example 21 and/or some other example herein, the apparatus to initiate an authentication procedure with a UE (user equipment) specified by the detach request message.

Example 23 may include the subject matter of any of examples 21-22 and/or some other example herein, wherein the authentication procedure is to be initiated based on whether the detach request message indicates switch off.

Example 24 may include the subject matter of any of examples 21-23 and/or some other example herein, wherein the third criterion includes at least one of: receipt of a response from the UE to a page after release of a connection with the UE; receipt of a periodic track area update request within a predetermined time after release of the connection with the UE, and the UE uses power save mode (PSM) and/or extended discontinuous reception (eDRX); receipt of the detach request message during an attach procedure and receipt of an attach complete message via a same connection that corresponds to the attach request message; or a count to be incremented based on the detach request message, if the message is not integrity protected or includes a non-verifiable message authentication code (MAC), is less than a threshold.

Example 25 may include the subject matter of any of examples 21-24 and/or some other example herein, wherein the apparatus is a network device or a portion thereof.

Example 26 is a method, comprising: identifying, or causing to be identified, a detach request message that is not integrity protected or includes a non-verifiable message authentication code (MAC); and checking, or causing to check, a criterion to identify whether to accept the detach request message.

Example 27 may include the subject matter of example 26 and/or some other example herein, further comprising checking the criterion to identify whether to accept the detach request message comprises means for initiating an authentication procedure with a UE (user equipment) specified by the detach request message.

Example 28 may include the subject matter of any of examples 26-27 and/or some other example herein, the authentication procedure to be initiated based on whether the detach request message indicates switch off.

Example 29 may include the subject matter of any of examples 27-28 and/or some other example herein, wherein the criterion includes at least one of: receipt of a response from the UE to a page after release of a connection with the UE; receipt of a periodic tracking area update request is received within a predetermined time after release of the connection with the UE, and the UE uses power saving mode (PSM) and/or extended discontinuous reception (eDRX); receipt of the detach request message during an attach procedure and receipt of an attach complete message via a same connection corresponding to the attach request message; or a count to be incremented based on the detach request message, if the message is not integrity protected or includes a non-verifiable message authentication code (MAC), is less than a threshold.

Example 30 may include the subject matter of any of examples 26-29 and/or some other example herein, wherein the method is performed, in whole or in part, by a network device or a portion thereof.

Example 31 is a method, comprising: transmitting, or causing to transmit, a detach request message that is not integrity protected or includes a non-verifiable message authentication code (MAC); and responding, or causing to respond, to at least one of an authentication request or a page to verify the detach request message.

Example 32 may include the subject matter of example 31 and/or some other example herein, further comprising identifying, or causing to be identified, a communication of the page after release of a non-access stratum (NAS) signaling connection.

Example 33 may include the subject matter of any of examples 31-32 and/or some other example herein, wherein the authentication request is of a remotely-initiated authentication procedure.

Example 34 may include the subject matter of any of examples 31-33 and/or some other example herein, further comprising: transmitting, or causing to be transmitted, an attach request; transmitting, or causing to be transmitted, an attach confirm in response to receipt of an attach accept for the attach request.

Example 35 may include the subject matter of any of examples 31-34 and/or some other example herein, wherein the method is performed, in whole or in part, by a UE (user equipment) or a portion thereof.

Example 36 may include an apparatus comprising means to perform one or more elements of a method described in or related to any of examples 1-35, or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 1-35, or any other method or process describe herein.

Example 38 may include an apparatus comprising logic, modules, and/or circuitry to perform one or more elements of a method described in or related to any of examples 1-35, or any other method or process described herein.

Example 39 may include a method, technique, or process as described in or related to any of examples 1-35, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-35, or portions thereof.

Example 41 may include a method of communicating in a wireless network as shown and described herein.

Example 42 may include a system for providing wireless communication as shown and described herein.

Example 43 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments. Additionally, other example embodiments may include any examples described above with the individual operations or device elements repeated or ordered with intervening elements or operations in any functional order.

Figure 6:
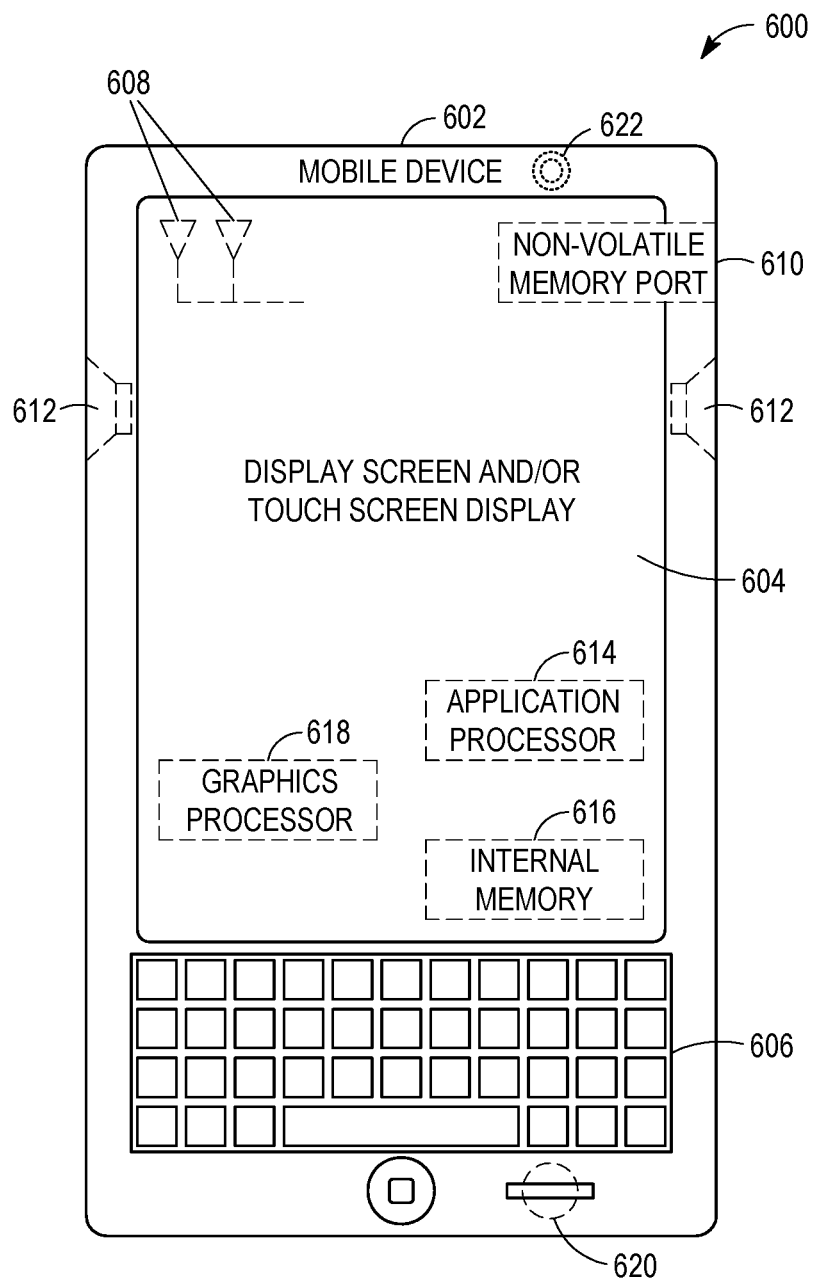
FIG. 6 illustrates an example UE, which may be configured for specialized operation or otherwise used with various embodiments described herein.

FIG. 6 shows an example UE 600. The UE 600 may be an implementation of the UE 102 or any device described herein. The UE 600 can include one or more antennas 608 configured to communicate with a transmission station, such as a base station, an eNB, or another type of wireless WAN (WWAN) access point. The UE 600 can communicate using separate antennas for each wireless communication standard or shared antennas for multiple wireless communication standards. The UE 600 can communicate in a wireless local area network (WLAN), a wireless personal area network (WPAN), and/or a WWAN.

FIG. 6 also shows a microphone 620 and one or more speakers 612 that can be used for audio input and output to and from the UE 600. As a headed device, UE 600 includes one or more interfaces for a UI. UE 600 particularly includes display screen 604, which can be a liquid crystal display (LCD) screen or another type of display screen such as an organic light-emitting diode (OLED) display. The display screen 604 can be configured as a touch screen. The touch screen can use capacitive, resistive, or another type of touch-screen technology. An application processor 614 and a graphics processor 618 can be coupled to an internal memory 616 to provide processing and display capabilities. A non-volatile memory port 610 can also be used to provide data input/output (I/O) options to a user. The non-volatile memory port 610 can also be used to expand the memory capabilities of the UE 600. A keyboard 606 can be integrated with the UE 600 or wirelessly connected to the UE 600 to provide additional user input. A virtual keyboard can also be provided using the touch screen. A camera 622 located on the front (display screen 604) side or the rear side of the UE 600 can also be integrated into a housing 602 of the UE 600.

Figure 7:
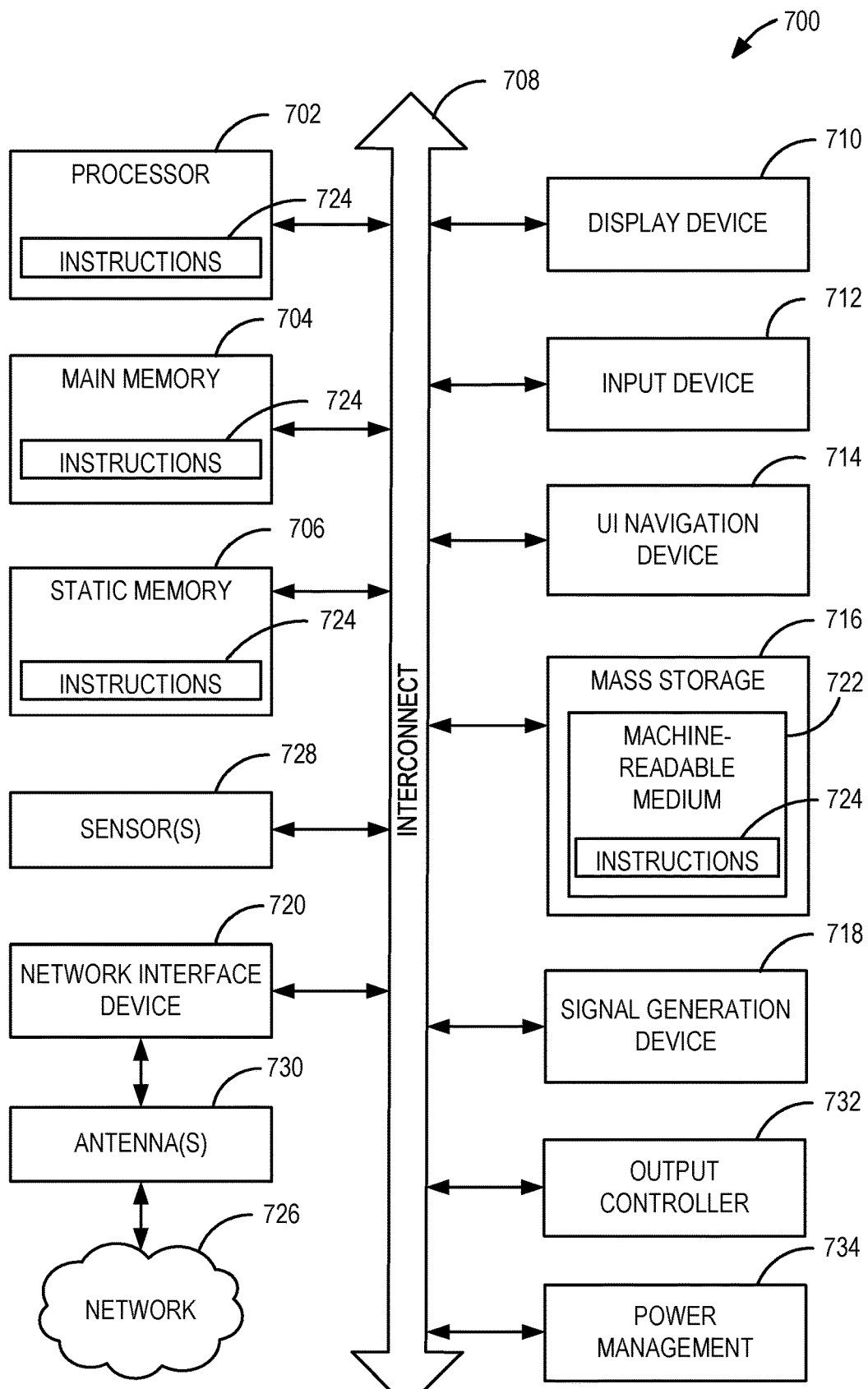
FIG. 7 is a block diagram illustrating an example computer system machine which may be used in association with various embodiments described herein.

FIG. 7 is a block diagram illustrating an example computer system machine 700 upon which any one or more of the methodologies herein discussed can be run, and which may be used to implement the eNB 104, the UE 102, or any other device described herein. In various alternative embodiments, the computer system machine 700 operates as a standalone device or can be connected (e.g., networked) to other machines. In a networked deployment, the computer system machine 700 can operate in the capacity of either a server or a client machine in server-client network environments, or it can act as a peer machine in peer-to-peer (or distributed) network environments. The computer system machine 700 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single computer system machine 700 is illustrated, the term "machine" shall also be taken to include any collection of machines that individually or jointly execute a set (or multiple sets) of instructions to perform any one or more of the methodologies discussed herein.

The example computer system machine 700 includes a processor 702 (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a video display device 710, an alphanumeric input device 712 (e.g., a keyboard), and a user interface (UI) navigation device 714 (e.g., a mouse). In one embodiment, the video display device 710, alphanumeric input device 712, and UI navigation device 714 are a touch screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a GPS sensor, compass, location sensor, accelerometer, or other sensor.

The mass storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, static memory 706, and/or processor 702 during execution thereof by the computer system machine 700, with the main memory 704, the static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., instructions 724) for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions 724) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 602.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 702.16 (e.g., 702.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

Figure 8:
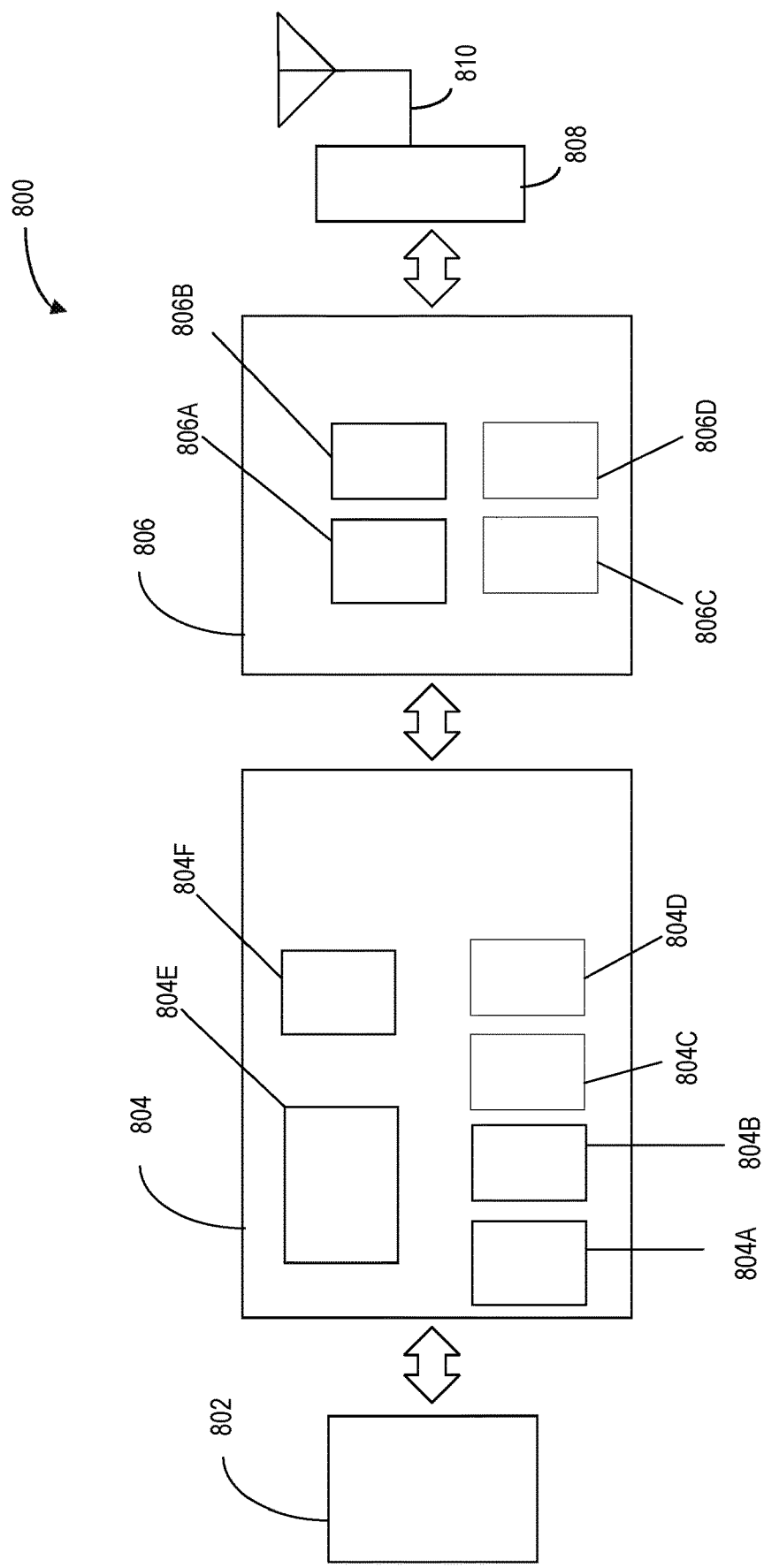
FIG. 8 illustrates aspects of a UE, a wireless apparatus, or a device, in accordance with some example embodiments.

Embodiments described herein may be implemented into a system using any suitably configured hardware and/or software. FIG. 8 illustrates components of a UE 800 in accordance with some embodiments. At least some of the components shown may be used in the UE 102 (or eNB 104) shown in FIG. 1. The UE 800 and other components may be configured to use the synchronization signals as described herein. The UE 800 may be one of the UEs 102 shown in FIG. 1 and may be a stationary, non-mobile device or may be a mobile device. In some embodiments, the UE 800 may include application circuitry 802, baseband circuitry 804, RF circuitry 806, FEM circuitry 808, and one or more antennas 810, coupled together at least as shown. At least some of the baseband circuitry 804, RF circuitry 806, and FEM circuitry 808 may form a transceiver. In some embodiments, other network elements, such as the eNB 104, may contain some or all of the components shown in FIG. 8. Other of the network elements, such as the MME 122, may contain an interface, such as the S1 interface, to communicate with the eNB 104 over a wired connection regarding the UE 800.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 800.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. The baseband circuitry 804 may interface with the application circuitry 802 for generation and processing of the baseband signals and for controlling operations of the RF circuitry 806. For example, in some embodiments, the baseband circuitry 804 may include a second generation (2G) baseband processor 804$a$, third generation (3G) baseband processor 804$b$, fourth generation (4G) baseband processor 804$c$, and/or other baseband processor(s) 804$d$ for other existing generations, generations in development, or generations to be developed in the future (e.g., fifth generation (5G), etc.). The baseband circuitry 804 (e.g., one or more of the baseband processors 804$a$-$d$) may handle various radio control functions that enable communication with one or more radio networks via the RF circuitry 806. The radio control functions may include, but are not limited to, signal modulation/demodulation, encoding/decoding, radio frequency shifting, and so forth. In some embodiments, modulation/demodulation circuitry of the baseband circuitry 804 may include FFT, precoding, and/or constellation mapping/demapping functionality. In some embodiments, encoding/decoding circuitry of the baseband circuitry 804 may include convolution, tail-biting convolution, turbo, Viterbi, and/or Low- Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, physical (PHY), MAC, radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP, and/or RRC layers. In some embodiments, the baseband circuitry 804 may include one or more audio digital signal processor(s) (DSPs) 804f. The audio DSP(s) 804f may be or include elements for compression/decompression and echo cancellation and may include other suitable processing elements in other embodiments. Components of the baseband circuitry 804 may be suitably combined in a single chip or a single chipset, or disposed on a same circuit board, in some embodiments. In some embodiments, some or all of the constituent components of the baseband circuitry 804 and the application circuitry 802 may be implemented together, such as, for example, on a system on a chip (SOC).

In some embodiments, the baseband circuitry 804 may provide for communication compatible with one or more radio technologies. For example, in some embodiments, the baseband circuitry 804 may support communication with an EUTRAN and/or other wireless metropolitan area networks (WMAN), a WLAN, or a WPAN. Embodiments in which the baseband circuitry 804 is configured to support radio communications of more than one wireless protocol may be referred to as multi-mode baseband circuitry. In some embodiments, the UE 800 can be configured to operate in accordance with communication standards or other protocols or standards, including IEEE 602.16 wireless technology (WiMax®), IEEE 602.11 wireless technology (Wi-Fi®) including IEEE 602.11ad, which operates in the 70 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, and like. technologies either already developed or to be developed.

The RF circuitry 806 may enable communication with wireless networks using modulated electromagnetic radiation through a non-solid medium. In various embodiments, the RF circuitry 806 may include switches, filters, amplifiers, and the like to facilitate the communication with the wireless network. The RF circuitry 806 may include a receive signal path which may include circuitry to down-convert RF signals received from the FEM circuitry 808 and provide baseband signals to the baseband circuitry 804. The RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b, and filter circuitry 806c. The transmit signal path of the RF circuitry 806 may include the filter circuitry 806c and the mixer circuitry 806a.

The RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by the synthesizer circuitry 806d. The amplifier circuitry 806b may be configured to amplify the down-converted signals, and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by the filter circuitry 806c. The filter circuitry 806c may include a LPF, although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio integrated circuit (IC) circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect, as other types of frequency synthesizers may be suitable. For example, the synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806d of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio.

In some example embodiments, the DLL may include a set of cascaded, tunable, delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

The FEM circuitry 808 may include a receive signal path, which may include circuitry configured to operate on RF signals received from the one or more antennas 810, amplify the received signals, and provide the amplified versions of the received signals to the RF circuitry 806 for further processing. The FEM circuitry 808 may also include a transmit signal path, which may include circuitry configured to amplify signals for transmission provided by the RF circuitry 806 for transmission by one or more of the one or more antennas 810.

In some embodiments, the FEM circuitry 808 may include a Tx/Rx switch to switch between transmit mode and receive mode operation. The FEM circuitry 808 may include a receive signal path and a transmit signal path. The receive signal path of the FEM circuitry 808 may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the UE 800 may include additional elements such as, for example, a memory/storage, display, camera, sensor, and/or I/O interface as described in more detail below. In some embodiments, the UE 800 described herein may be part of a portable wireless communication device, such as a PDA, a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 800 may include one or more user interfaces designed to enable user interaction with the system and/or peripheral component interfaces designed to enable peripheral component interaction with the system. For example, the UE 800 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or light-emitting diode (LED) screen including a touch screen. The sensor may include a gyro sensor, an accelerometer, a proximity sensor, an ambient light sensor, and a positioning unit. The positioning unit may communicate with components of a positioning network, e.g., a GPS satellite.

The antennas 810 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 810 may be effectively separated to benefit from spatial diversity and the different channel characteristics that may result.

Although the UE 800 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Figure 9:
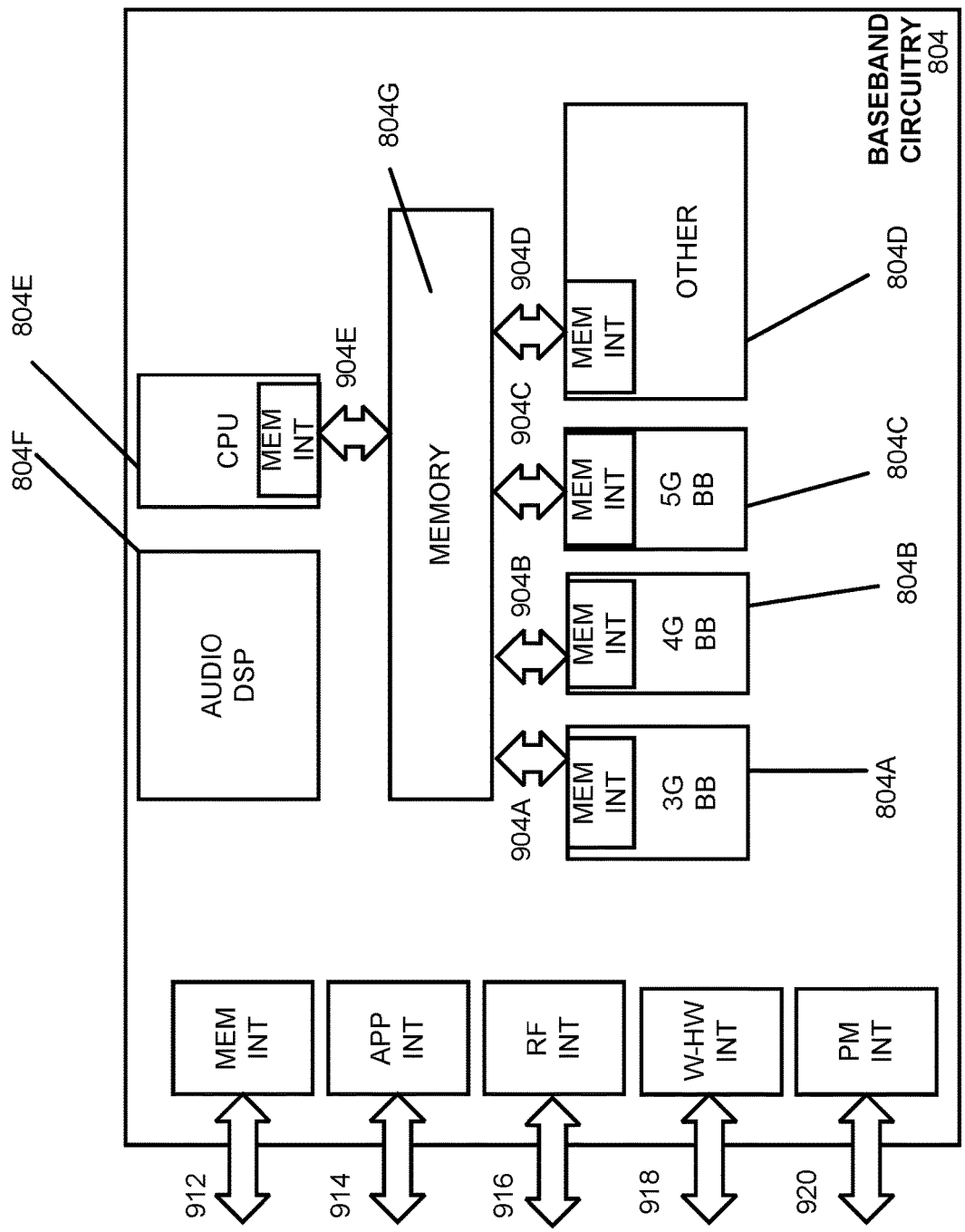
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM, Electrically Erasable Programmable Read-Only Memory (EEPROM)) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), HTTP, etc.). Example communication networks may include a LAN, a WAN, a packet data network (e.g., the Internet), mobile telephone networks (e.g., cellular networks), Plain Old Telephone Service (POTS) networks, wireless data networks (e.g., IEEE 602.11 family of standards known as Wi-Fi®, IEEE 602.16 family of standards known as WiMAX®), IEEE 602.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim is still deemed to fall within the scope of that claim. Moreover, in the following claims, the terms "first," "second," "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a mobility management entity (MME) of a network, the network configured to communicate with user equipment (UE) that are configured to send detach requests without any integrity protection when attached to the network for emergency bearer services with no shared evolved packet system (EPS) security context available, the apparatus comprising:

an interface configured to receive a non-access stratum (NAS) message comprising a UE-initiated detach request associated with a first user equipment (UE) in an EMM-REGISTERED state; and processing circuitry coupled to the interface and configured to:

determine whether the detach request is received without integrity protection;

analyze one or more additional criteria associated with the detach request in response to confirmation that the detach request message is received without the integrity protection to determine whether the UE is attached to the network for emergency bearer services with no shared EPS security context available; and manage an EPS mobility management (EMM) registration state for the first UE based on analysis of the one or more additional criteria, wherein the one or more additional criteria includes at least one of whether the UE is performing periodic tracking area updating and whether the UE is responding to paging, and wherein to manage the EPS EMM registration state, the processing circuitry is configured to:

ignore the detach request, the UE is to remain in the EMM-REGISTERED state, when the detach request was received without integrity protection when the UE has performed the periodic tracking area updating since receipt of the detach request or when the UE has responded to paging since receipt of the detach request, and process the detach request when the detach request was received without integrity protection when the UE has not performed the periodic tracking area updating since receipt of the detach request or when the UE has not responded to paging since receipt of the detach request, wherein the detach request is determined to be fraudulent when the detach request was received without integrity protection when the UE has performed the periodic tracking area updating since receipt of the detach request or when the UE has responded to pacing since receipt of the detach request, and wherein the detach request is determined to be genuine when the detach request was received without integrity protection when the UE has not performed the periodic tracking area updating since receipt of the detach request or when the UE has not responded to pacing since receipt of the detach request.

2. The apparatus of claim 1, wherein the one or more additional criteria further comprise the passing of an authentication procedure; and wherein the processing circuitry is configured to process one or more authentication communications with the first UE as part of the authentication procedure.

3. The apparatus of claim 2, wherein the processing circuitry is further configured to:

process the detach request to determine that the detach request is not due to a switch off associated with the first UE;

wherein the authentication procedure is initiated, at least in part, in response to the determination that the associated detach request is not due to the switch off associated with the first UE.

4. The apparatus of claim 3, wherein the processing circuitry is further configured to:

process an authentication communication of the one or more authentication communications received at the MME from the first UE; and mark the EMM registration state for the first UE as EMM-DEREGISTERED, in response to a determination that the first UE has passed the authentication procedure.

5. The apparatus of claim 4, wherein the processing circuitry is further configured to determine, from the one or more authentication communications received at the MME whether the first UE has passed the authentication procedure prior to marking the EMM registration state for the first UE.

6. The apparatus of claim 1, wherein when the first UE is attached to the network for emergency bearer services with no shared EPS security context available, the additional criteria comprise any of:

whether the first UE is responding to a paging procedure performed after the network releases the connection with the first UE; or whether the first UE is performing at least one periodic tracking area update after the network releases the connection with the first UE.

7. The apparatus of claim 1, wherein the additional criteria are selected based on the first UE using power saving mode (PSM).

8. The apparatus of claim 7 wherein when the first UE uses the PSM, the additional criteria comprise any of:
the passing of an authentication procedure; or
whether the first UE is performing at least one periodic tracking area update after the network releases the connection with the first UE.

9. The apparatus of claim 1, wherein the additional criteria are selected based on the first UE using extended discontinuous reception (eDRX).

10. The apparatus of claim 9, wherein when the first UE uses extended discontinuous reception (eDRX), the additional criteria comprise any of:
the passing of an authentication procedure; or
whether the first UE is performing at least one periodic tracking area update after the network releases the connection with the first UE.

11. The apparatus of claim 1, wherein the additional criteria comprises a determination that the detach request is received during an attach procedure and the network receives an attach complete message from the first UE following receipt of the detach request message from the first UE.

12. The apparatus of claim 1, wherein the additional criteria comprises a criterion that a number of counted events within a time interval exceeds a threshold limit;
wherein the network comprising the MME maintains at least one counter of the number of counted events for counting events where the network receives an associated detach request message that does not include a message authentication code (MAC) or where the associated detach request message includes a MAC that the network is not able to verify.

13. The apparatus of claim 1, wherein processing the detach request message to confirm that the detach request message is received from the UE without integrity protection comprises determining that a message authentication code (MAC) received as part of the detach request message is unverifiable.

14. The apparatus of claim 1, wherein processing the detach request message to confirm that the detach request message is received from the UE without integrity protection comprises determining that the detach request message does not include a message authentication code (MAC).

15. The apparatus of claim 1, wherein analyzing the one or more additional criteria associated with the detach request comprises:
determining that the detach request is due to switch off at the first UE; and
in response to the determining that the detach request is due to the switch off, managing the EMM registration state to ignore the detach request and remain in an EMM-REGISTERED state.

16. The apparatus of claim 1, wherein the apparatus further comprises:
a memory coupled to the processing circuitry and configured to store the NAS signaling detach request message; and
an antenna coupled to the interface and configured to transmit and receive one or more communications with the first UE comprising at least the NAS signaling detach request message.

17. A non-transitory computer readable medium comprising instructions that, when executed by processing circuitry of an apparatus of a mobility management entity (MME) of a network, the network configured to communicate with user equipment (UE) that are configured to send detach requests without any integrity protection when attached to the network for emergency bearer services with no shared evolved packet system (EPS) security context available, the processing circuitry configured to cause the apparatus to:
receive, at an interface, a non-access stratum (NAS) message comprising a UE-initiated detach request associated with a first user equipment (UE) in an EMM-REGISTERED state;
determine whether the detach request is received from the UE without integrity protection;
analyze one or more additional criteria associated with the detach request in response to confirmation that the detach request message is received from the UE without the integrity protection to determine whether the UE is attached to the network for emergency bearer services with no shared EPS security context available; and
manage an EPS mobility management (EMM) registration state for the first UE based on analysis of the one or more additional criteria,
wherein the one or more additional criteria includes at least one of whether the UE is performing periodic tracking area updating and whether the UE is responding to paging, and
wherein to manage the EPS EMM registration state, the processing circuitry is configured to:
ignore the detach request, the UE is to remain in the EMM-REGISTERED state, when the detach request was received without integrity protection when the UE has performed the periodic tracking area updating since receipt of the detach request or when the UE has responded to paging since receipt of the detach request, and
process the detach request when the detach request was received without integrity protection when the UE has not performed the periodic tracking area updating since receipt of the detach request or when the UE has not responded to paging since receipt of the detach request,
wherein the detach request is determined to be fraudulent when the detach request was received without integrity protection when the UE has performed the periodic tracking area updating since receipt of the detach request or when the UE has responded to paging since receipt of the detach request, and
wherein the detach request is determined to be genuine when the detach request was received without integrity protection when the UE has not performed the periodic tracking area updating since receipt of the detach request or when the UE has not responded to pacing since receipt of the detach request.

18. The non-transitory computer readable medium of claim 17, wherein the one or more additional criteria further comprise the passing of an authentication procedure; and
wherein the processing circuitry is configured to process one or more authentication communications with the first UE as part of the authentication procedure.

* * * * *